US011442288B2

(12) United States Patent
Kasahara et al.

(10) Patent No.: US 11,442,288 B2
(45) Date of Patent: Sep. 13, 2022

(54) OPTICAL UNIT WITH SHAKE-CORRECTION FUNCTION

(71) Applicant: NIDEC SANKYO CORPORATION, Nagano (JP)

(72) Inventors: Shogo Kasahara, Nagano (JP); Shinji Hatano, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 41 days.

(21) Appl. No.: 17/191,623

(22) Filed: Mar. 3, 2021

(65) Prior Publication Data

US 2021/0278690 A1 Sep. 9, 2021

(30) Foreign Application Priority Data

Mar. 4, 2020 (JP) .............................. JP2020-036403

(51) Int. Cl.
*G02B 27/64* (2006.01)
*G02B 7/02* (2021.01)

(52) U.S. Cl.
CPC ............. *G02B 27/646* (2013.01); *G02B 7/02* (2013.01)

(58) Field of Classification Search
USPC ...................................... 359/557; 396/52–55
See application file for complete search history.

(56) References Cited

U.S. PATENT DOCUMENTS

| 9,041,818 | B2 | 5/2015 | Takahashi et al. |
| 10,107,987 | B2 | 10/2018 | Osaka et al. |
| 10,649,226 | B2 | 5/2020 | Minamisawa et al. |
| 10,795,236 | B2 | 10/2020 | Minamisawa et al. |
| 2012/0229927 | A1 | 9/2012 | Ohishi et al. |
| 2016/0170227 | A1 | 6/2016 | Minamisawa |
| 2020/0341289 | A1 | 10/2020 | Minamisawa |
| 2021/0223663 | A1 | 7/2021 | Minamisawa |
| 2021/0278688 | A1* | 9/2021 | Hatano .................... G03B 5/02 |
| 2021/0278691 | A1* | 9/2021 | Hatano .................... G02B 7/02 |

(Continued)

FOREIGN PATENT DOCUMENTS

| CN | 102640029 | 8/2012 |
| CN | 106537215 | 3/2017 |
| CN | 108073011 | 5/2018 |

(Continued)

*Primary Examiner* — Clayton E. LaBalle
*Assistant Examiner* — Warren K Fenwick
(74) *Attorney, Agent, or Firm* — JCIPRNET

(57) ABSTRACT

An optical unit with shake-correction function is provided. A movable body is supported by a fixed body via a gimbal mechanism. The fixed body includes a case surrounding the movable body. The gimbal mechanism includes a gimbal frame having a second axis-side extension part protruding in a direction of a second axis and a second connecting mechanism connecting the second axis-side extension part and the case. The second axis-side extension part includes a first portion extending in a direction of Z-axis, a bent portion bending from an end of the first portion, and a second portion extending from the bent portion in a −Z direction. The second connecting mechanism connects the second portion and the case, and the fixed body includes an object-side end plate portion facing the bent portion from the direction of the Z axis on an outer side of the first portion in a radial direction.

6 Claims, 17 Drawing Sheets

(56) References Cited

U.S. PATENT DOCUMENTS

2021/0278692 A1\* 9/2021 Kasahara ............... G02B 7/023
2021/0278693 A1\* 9/2021 Kasahara ............... G02B 7/003

FOREIGN PATENT DOCUMENTS

| | | |
|---|---|---|
| CN | 111856837 | 10/2020 |
| CN | 112540491 | 3/2021 |
| JP | 2011215390 | 10/2011 |
| JP | 2013178329 | 9/2013 |
| JP | 2018077392 | 5/2018 |
| JP | 2018169497 | 11/2018 |
| JP | 2019200270 | 11/2019 |
| WO | 2019221038 | 11/2019 |

\* cited by examiner

OPTICAL UNIT WITH SHAKE-CORRECTION FUNCTION

CROSS REFERENCE TO RELATED APPLICATION

The present application claims priority under 35 U.S.C. § 119 to Japanese Application No. 2020-036403, filed on Mar. 4, 2020, and the entire content of which is incorporated herein by reference.

BACKGROUND

Field of the Invention

The present invention relates to an optical unit with shake-correction function for correcting shake by rotating a camera module around an optical axis.

Description of the Related Documents

In an optical unit mounted on a mobile terminal or a mobile body, there is an optical unit that rotates a movable body provided with a camera module, along an optical axis, a first axis perpendicular to the optical axis, and a second axis orthogonal to the optical axis and the first axis, in order to suppress the disturbance of an image captured when the mobile terminal or the mobile body is moved. Japanese Unexamined Patent Publication No. 2019-200270 (Patent Document 1) describes such an optical unit with shake-correction function.

An optical unit with a shake-correction function of the Japanese Unexamined Patent Application Publication No. 2019-200270 includes a movable body including a camera module, a rotational support structure that supports the movable body to be rotatable around an optical axis, a gimbal mechanism, and a fixed body that supports the movable body via the gimbal mechanism and the rotational support structure. The movable body is arranged on an inner circumference side of the fixed body. The rotational support structure includes an intermediate frame body arranged between the movable body and the fixed body, and a plurality of plate springs spanned in a radial direction between the movable body and the intermediate frame body. The plurality of plate springs is arranged at equal angular intervals around the optical axis, allowing the movable body to rotate around the optical axis with respect to the intermediate frame body. The gimbal mechanism includes a gimbal frame, a first connecting mechanism that connects a first axis-side extension part and the intermediate frame body to be rotatable around a first axis, and a second connecting mechanism that connects the gimbal frame and the fixed body to be rotatable around a second axis. The fixed body includes a flat plate portion that covers an end portion of the gimbal frame in a direction of the second axis from an object side in the direction of the optical axis.

In the optical unit with a shake-correction function of the Japanese Unexamined Patent Application Publication No. 2019-200270, when the connection of the second connecting mechanism that connects the gimbal frame and the fixed body is disconnected due to an external impact or the like, the gimbal frame and the movable body fall out of the fixed body to the object side in the direction of the optical axis. Here, the Japanese Unexamined Patent Application Publication No. 2019-200270 includes a flat plate portion in which the fixed body covers the end portion of the gimbal frame in the direction of the second axis from the object side in the direction of the optical axis. Therefore, it seems that the contact between the end portion of the gimbal frame in the direction of the second axis and the flat plate portion of the fixed body can prevent or suppress the gimbal frame and the movable body from falling out of the fixed body. However, since the flat plate portion of the fixed body is located closer to the object side than the gimbal frame, there is a problem that the fixed body becomes larger in the direction of the optical axis.

In view of these points, the present invention provides an optical unit with a shake-correction function that can prevent the gimbal frame and the movable body from falling off toward the object side while suppressing the fixed body from becoming large in the direction of the optical axis.

SUMMARY

The optical unit with a shake-correction function of an embodiment of the present invention includes: a movable body including a camera module; a gimbal mechanism, configured to support the movable body to be rotatable around a first axis that intersects an optical axis of a lens of the camera module, and support the movable body to be rotatable around a second axis that intersects the optical axis and the first axis; and a fixed body including a case in frame-shape configured to surround the movable body from an outer side in a radial direction around the optical axis, and support the movable body via the gimbal mechanism. The gimbal mechanism includes: a gimbal frame, having: a main body that overlaps with the movable body when viewed from a direction of the optical axis, a first axis-side extension part that protrudes from the main body in a direction of the first axis, and a second axis-side extension part that protrudes from the main body in a direction of the second axis; a first connecting mechanism, configured to connect the first axis-side extension part and the movable body to be rotatable around the first axis; and a second connecting mechanism configured to connect the second axis-side extension part and the case to be rotatable around the second axis. The second axis-side extension part includes: a first portion, configured to extend in the direction of the optical axis on an outer side of the movable body in the direction of the second axis; a bent portion, configured to bend outward in a radial direction from an end of the first portion on a side opposite to an object; and a second portion, configured to extend in the direction of the optical axis from an end of the bent portion on an outer circumference side to the side opposite to the object. The second connecting mechanism is configured to connect the second portion and the case, and the fixed body includes a retaining portion facing the bent portion from the direction of the optical axis on an outer side in the radial direction of the first portion.

According to an embodiment of the present invention, the fixed body includes the retaining portion facing the second axis-side extension part of the gimbal frame connected to the fixed body by the second connecting mechanism from the object side in the direction of the optical axis. Therefore, even if the connection of the second connecting mechanism is disconnected due to an external impact or the like, it is possible to prevent the gimbal frame and the movable body from falling off from the fixed body toward the object side in the direction of the optical axis. Here, the second axis-side extension part of the gimbal frame includes the first portion that extends in the direction of the optical axis on the outer side in the direction of the second axis of the movable body, the bent portion that bends outward in the radial direction from the end of the first portion on the side opposite to the object, and the second portion that extends in the direction of the optical axis from the end of the bent portion on the outer circumference side to the side opposite to the object, and the second connecting mechanism connects the second portion and the case. In addition, the retaining portion faces the bent portion from the direction of the optical axis on the outer side of the first portion in the radial direction of the second axis-side extension part of the gimbal frame. As a result, the retaining portion is not located closer to the object side than the first portion of the second axis-side extension part. In other words, the retaining portion is not located closer to the object side than the gimbal frame. Thus, it is possible to prevent the fixed body from becoming larger in the direction of the optical axis.

In an embodiment of the present invention, further includes: a rotational support structure, configured to support the movable body to be rotatable around the optical axis of the lens of the camera module. The gimbal mechanism is configured to support the movable body via the rotational support structure. The fixed body is configured to support the movable body via the gimbal mechanism and the rotational support structure. The rotational support structure includes: a first annular groove, provided in the movable body coaxially with the optical axis; a plate roller, having a second annular groove facing the first annular groove in the direction of the optical axis; a plurality of spherical objects, configured to be inserted into the first annular groove and the second annular groove, and roll between the movable body and the plate roller; and a pressurizing structure, configured to apply a force for bringing the first annular groove and the second annular groove closer to each other in the direction of the optical axis. The first connecting mechanism is configured to connect the first axis-side extension part and the plate roller. In this way, the rotational support structure that supports the movable body to be rotatable around the optical axis is supported to be rotatable around the first axis and the second axis by the gimbal mechanism. Therefore, the movable body can be rotated around the rotational axis that coincides with the optical axis even when the movable body is rotating around the first axis or the second axis. Moreover, the rotational support structure includes a plurality of the spherical objects inserted into the first annular groove provided in the movable body and the second annular groove provided in the plate holder and roll. Therefore, the rotational axis of the movable body does not become unstable. Further, in the rotational support structure, the first annular groove facing the second annular groove of the plate holder in the direction of the optical axis is provided in the movable body. Therefore, the rotational support structure can be made smaller in the direction of the optical axis as compared with the case where the first annular groove is provided in a member separate from the movable body.

In an embodiment of the present invention, further includes: a shake corrective-magnet drive structure, configured to rotate the movable body around the first axis and the second axis. The case includes a frame plate portion made of non-magnetic metal that surrounds the movable body around the optical axis. The shake corrective-magnet drive structure includes: a shake corrective magnet, fixed to the movable body; and a shake corrective coil, fixed to a side opposite to the shake corrective magnet in the frame plate portion. The first portion is located inside the frame plate portion. The second portion is located on an outer circumference side of the frame plate portion. The bent portion overlaps with the frame plate portion when viewed from the direction of the optical axis. In this way, the gimbal frame can be made smaller in the direction of the second axis as compared with the case where the bent portion is located closer to the outer circumference side than the frame plate portion. In addition, the retaining portion can be positioned on the inner side in the radial direction as compared with the case where the bent portion is located closer to the outer circumference side than the frame plate portion. As a result, the movable body can be made smaller in the radial direction.

In an embodiment of the present invention, the frame plate portion may include a notch at an edge on a side of the object that overlaps with the second axis when viewed from the direction of the optical axis, and the bent portion may be located inside the notch. In this way, the retaining portion can be provided at a position close to the edge on the object side of the frame in the direction of the optical axis. Therefore, it is possible to prevent the fixed body from becoming larger in the direction of the optical axis.

In an embodiment of the present invention, the second connecting mechanism includes: a spherical object, located on an outer circumference side of the frame plate portion; a thrust receiving member, configured to be fixed to a side opposite to the movable body of the frame plate portion, and support the spherical object on the second axis at a position separated from the frame plate portion; and a recessed curved surface, provided on the second portion and recessed to an inner circumference side. The second portion is inserted between the spherical object and the frame plate portion. The recessed curved surface and the spherical object are in contact with each other on the second axis. In this way, the fixed body and the gimbal frame can be connected to be rotatable around the second axis by the second connecting mechanism.

In an embodiment of the present invention, the fixed body includes a cover having: a cover frame portion, configured to cover the frame plate portion and the shake corrective coil from an outer circumference side; and an object-side end plate portion, configured to extend from an end of the cover frame portion on a side of the object to an inner circumference side. The object-side end plate portion may be the retaining portion. In this way, the retaining portion can be easily provided on the fixed body.

According to the present invention, the fixed body includes the retaining portion facing the second axis-side extension part of the gimbal frame connected to the fixed body by the second connecting mechanism from the object side in the direction of the optical axis. Therefore, even if the connection of the second connecting mechanism is disconnected due to an external impact or the like, it is possible to prevent the gimbal frame and the movable body from falling off from the fixed body toward the object side in the direction of the optical axis. In addition, the retaining portion faces the bent portion from the direction of the optical axis on the outer side of the first portion in the radial direction of the second axis-side extension part of the gimbal frame. As a result, the retaining portion is not located closer to the object side than the gimbal frame. Thus, it is possible to prevent the fixed body from becoming larger in the direction of the optical axis.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

Hereinafter, embodiments of an optical unit with shake-correction function to which at least an embodiment of the present invention is applied will be described with reference to the drawings.

Overall Configuration

Figure 1:
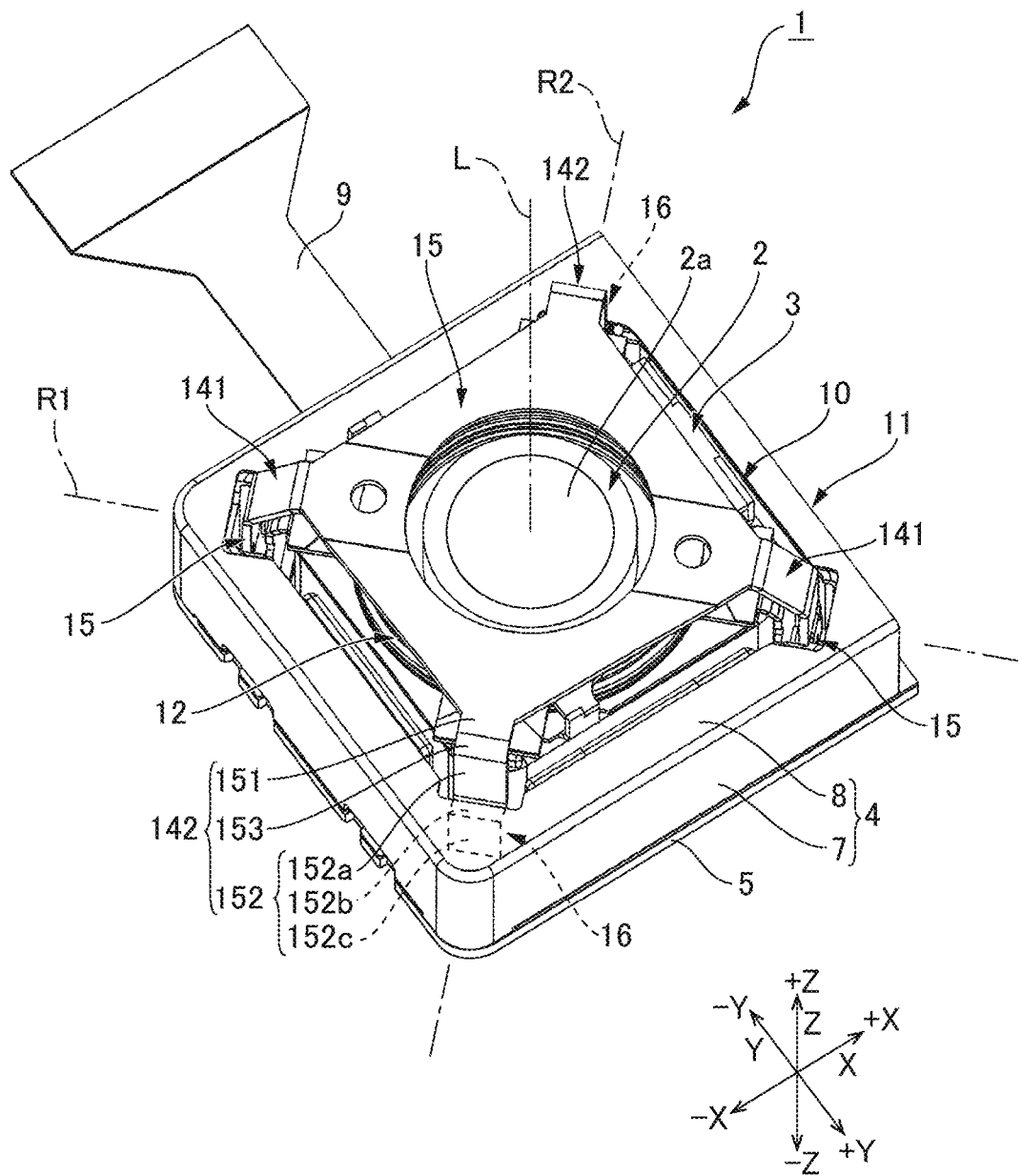
FIG. 1 is a perspective view of an optical unit with shake-correction function.
Figure 2:
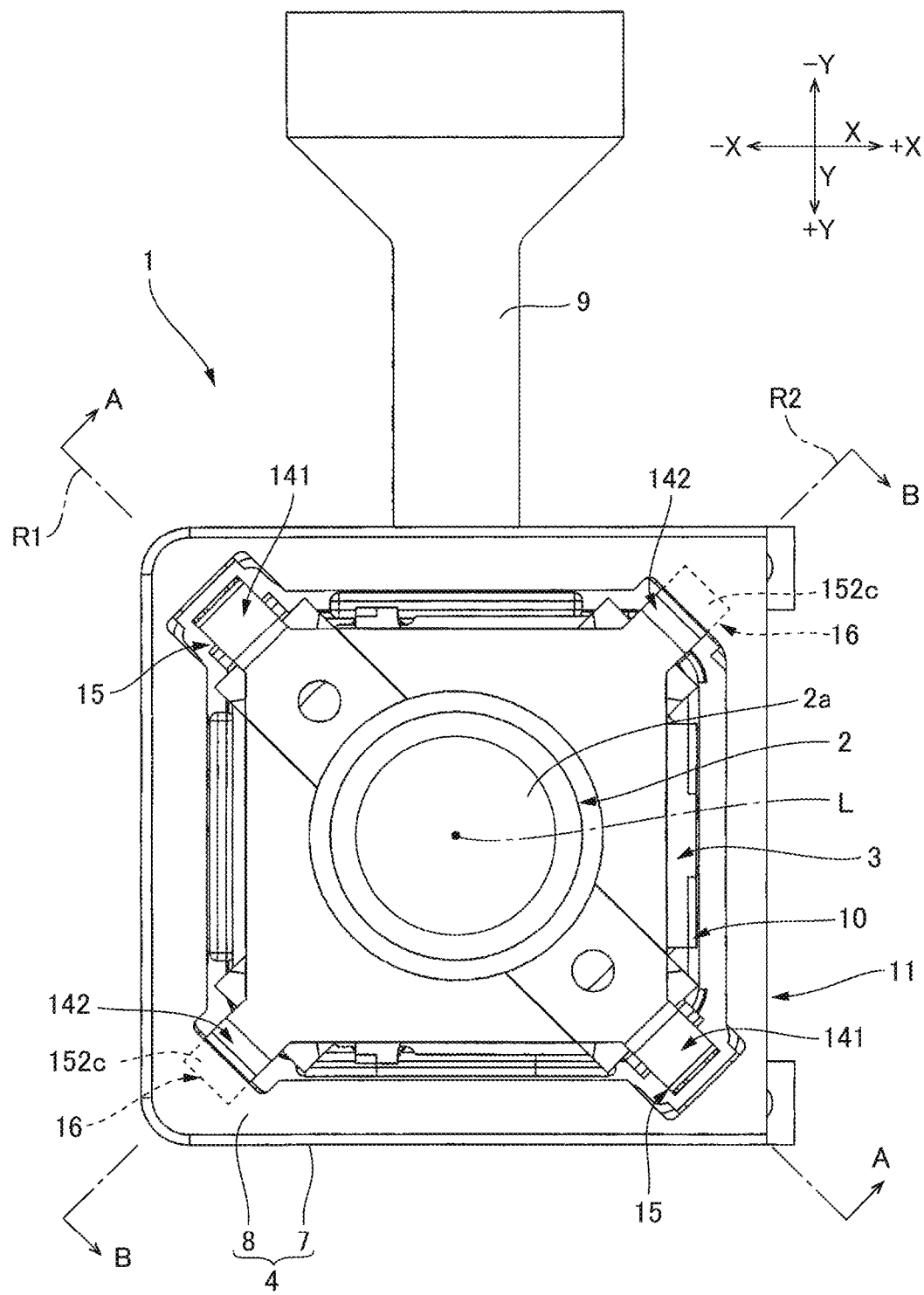
FIG. 2 is a plan view of the optical unit with shake-correction function when viewed from an object side.
Figure 3:
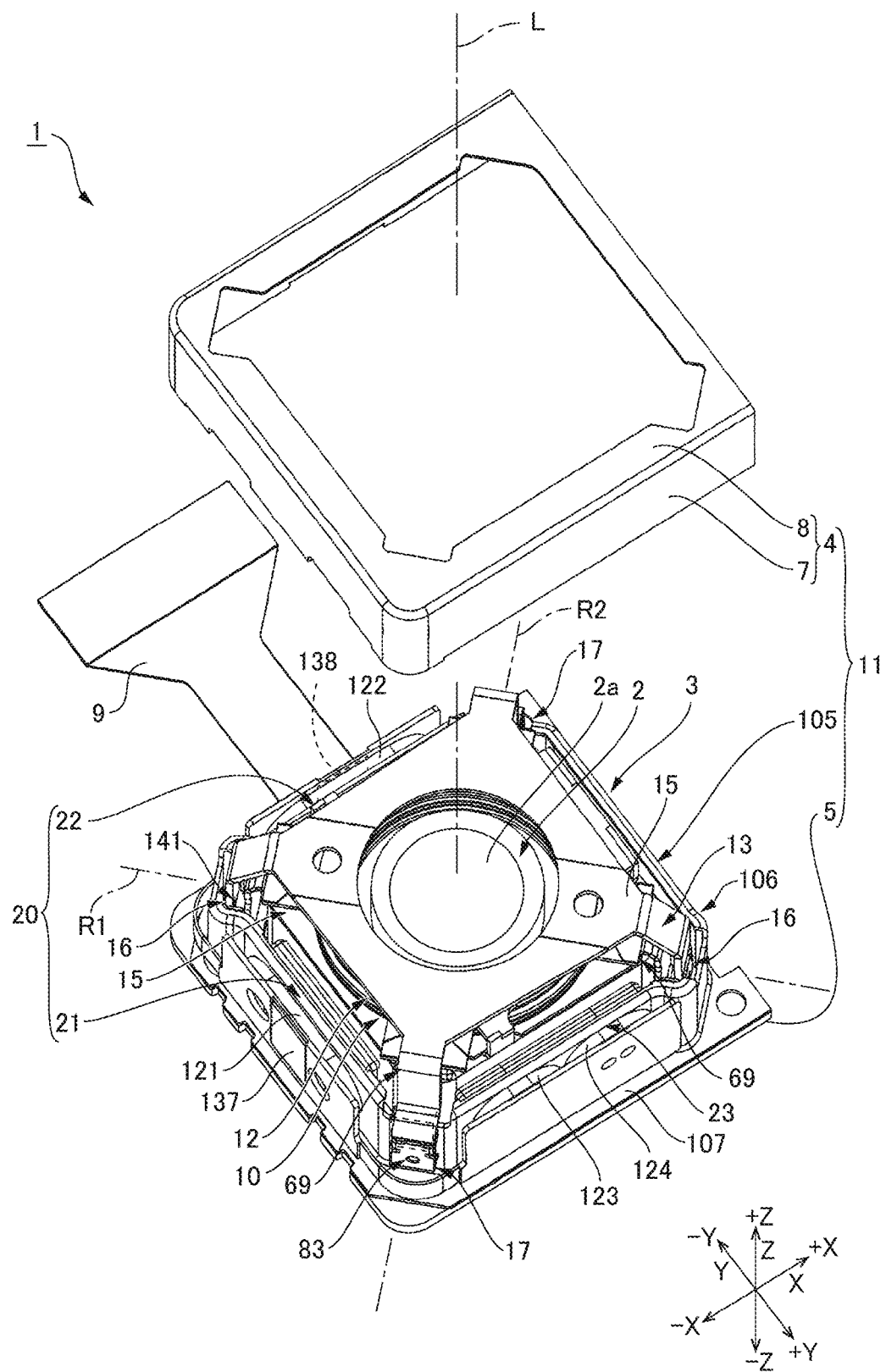
FIG. 3 is an exploded perspective view of the optical unit with shake-correction function.
Figure 4:
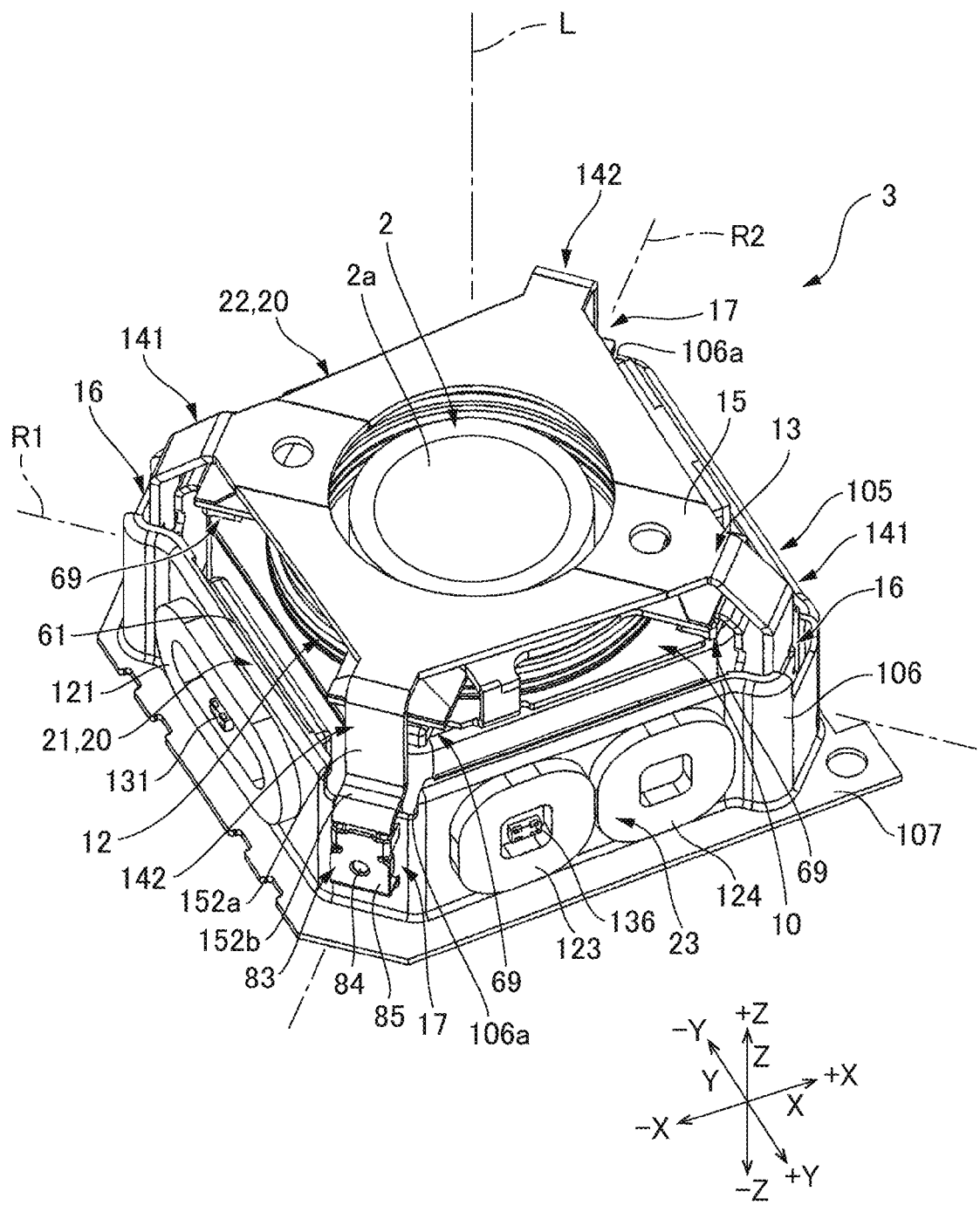
FIG. 4 is a perspective view of an optical unit main body.
Figure 5:
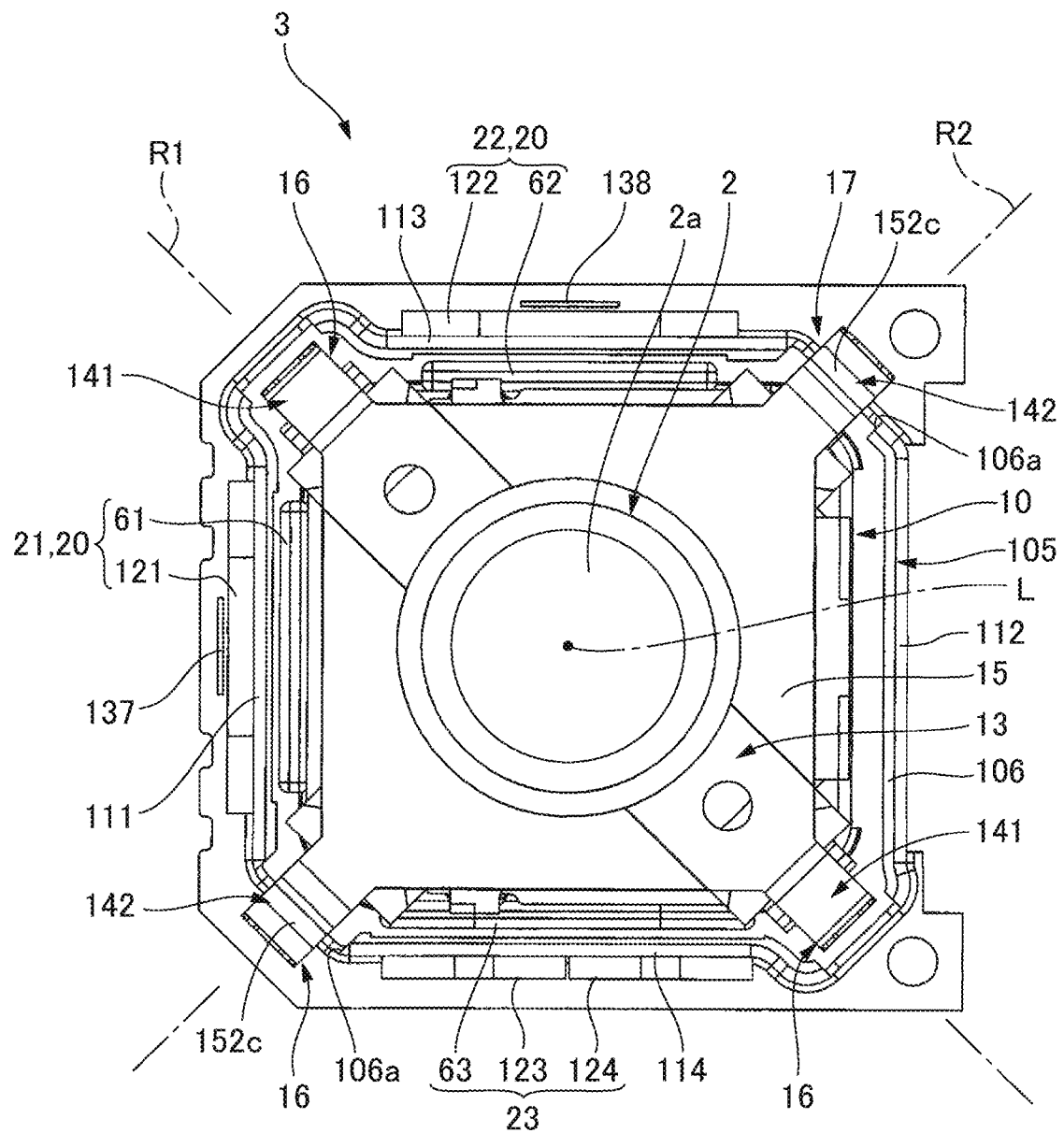
FIG. 5 is a plan view of the optical unit main body.
Figure 6:
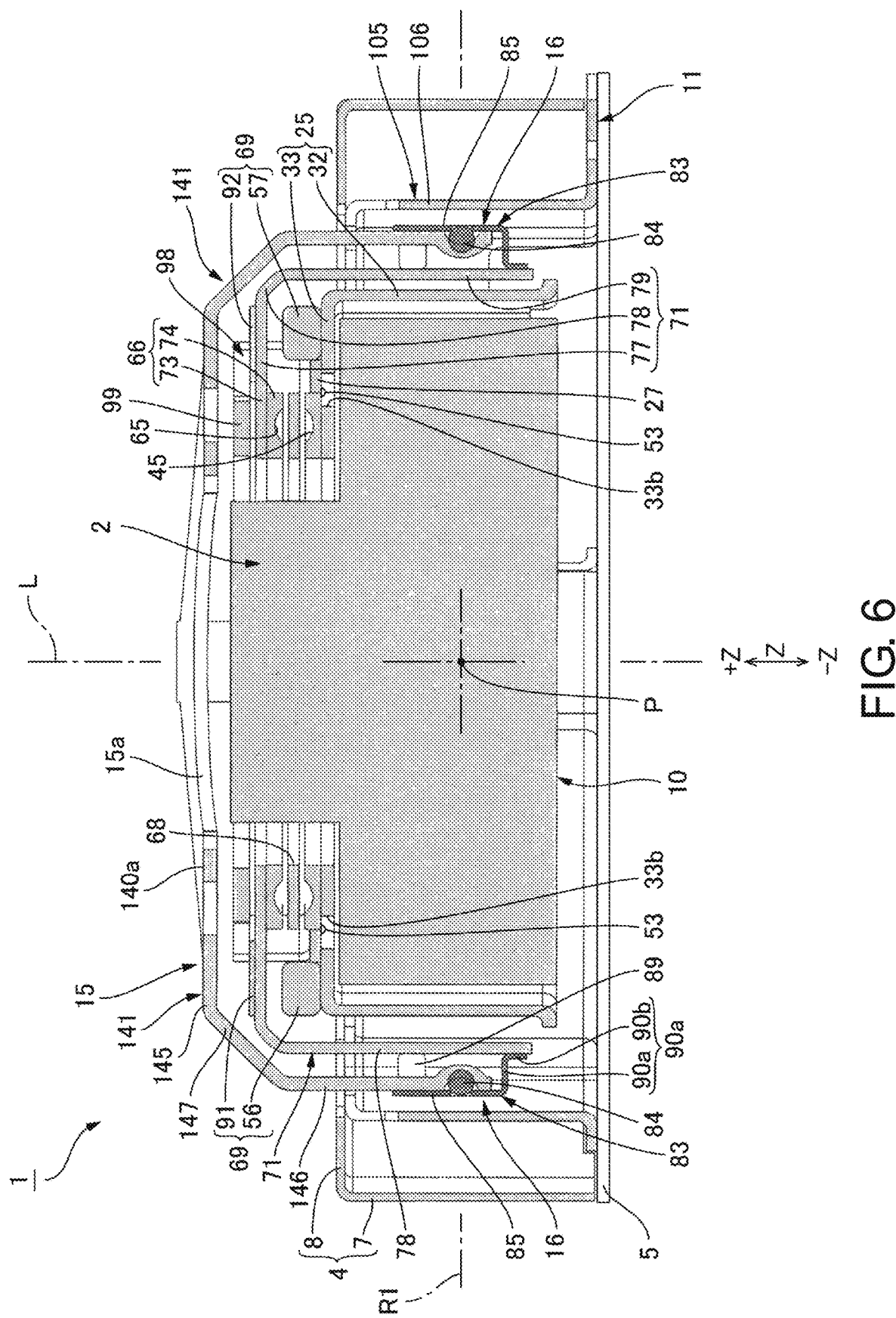
FIG. 6 is a cross-sectional view taken along the line A-A of FIG. 2.
Figure 7:
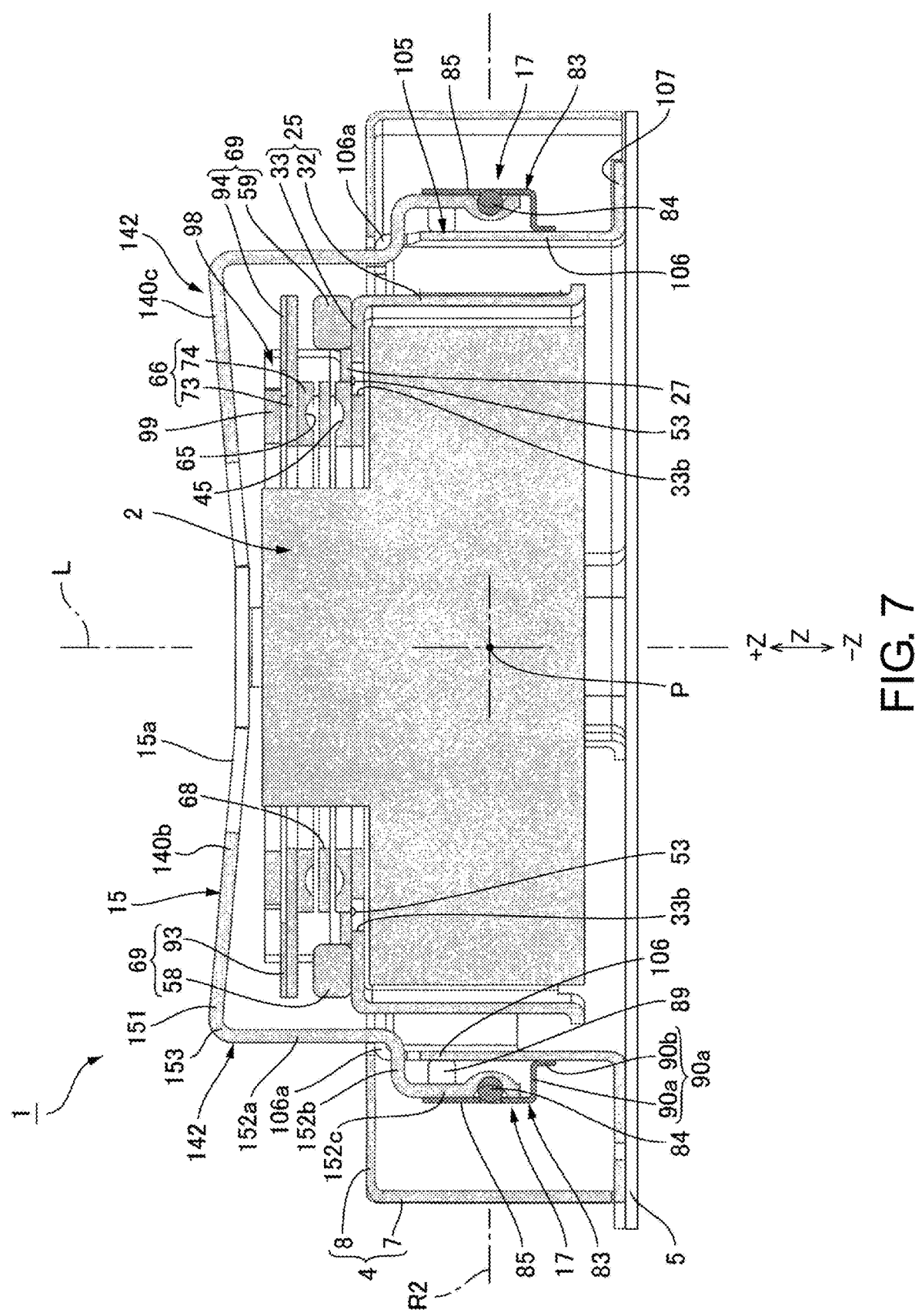
FIG. 7 is a cross-sectional view taken along the line B-B of FIG. 2.

FIG. 1 is a perspective view of an optical unit with shake-correction function. FIG. 2 is a plan view of the optical unit with shake-correction function when viewed from an object side (i.e., a side of the object). FIG. 3 is an exploded perspective view of the optical unit with shake-correction function. FIG. 4 is a perspective view of an optical unit main body. In FIG. 4, a base, a flexible printed board, a first magnetic plate, and a second magnetic plate are omitted. FIG. 5 is a plan view of the optical unit main body. In FIG. 5, the base and the flexible printed board are omitted. FIG. 6 is a cross-sectional view taken along the line A-A of FIG. 2. FIG. 7 is a cross-sectional view taken along the line B-B of FIG. 2.

As illustrated in FIG. 1, the optical unit 1 with shake-correction function includes an optical unit main body 3 that includes a camera module 2, a cover 4 that accommodates the optical unit main body 3, and a base 5 that covers the optical unit main body 3 from the counter object side (i.e., a side opposite to an object). The cover 4 includes a cover frame portion 7 with a substantially rectangular shape that covers the optical unit main body 3 from the outer circumference side, and an object-side end plate portion 8 with a frame shape that protrudes toward the inner circumferential side from the edge of the cover frame portion 7 on the object side. The base 5 has a plate shape. The camera module 2 includes a lens 2a, and an imaging element (not illustrated) disposed on an optical axis L of the lens 2a. Further, as illustrated in FIG. 3, the optical unit main body 3 includes a flexible printed board 9 that is routed along the outer circumference surface of the optical unit main body 3.

The optical unit 1 with shake-correction function is used, for example, in an optical device such as a camera-equipped mobile phone or a drive recorder, or an optical device such as an action camera or a wearable camera mounted on a moving object such as a helmet, a bicycle, or a radio-control helicopter. In such an optical device, when the optical device shakes during capturing, the captured image is distorted. The optical unit 1 with shake-correction function corrects the inclination of the camera module 2, based on the acceleration, the angular velocity, the shake amount, and the like, which are detected by a detection unit such as a gyroscope, in order to prevent the captured image from being inclined.

The optical unit 1 with shake-correction function of the present example rotates the camera module 2 around the optical axis L of the lens 2a, around a first axis R1 orthogonal to the optical axis L, and around a second axis R2 orthogonal to the optical axis L and the first axis R1 to perform shake correction.

In the following description, the three axes orthogonal to one another are referred to as the direction of the X axis, the direction of the Y axis, and the direction of the Z axis. Further, one side in the direction of the X axis is referred to as a −X direction, and the other side is referred to as a +X direction. One side in the direction of the Y axis is referred to as a −Y direction, and the other side is referred to as a +Y direction. One side in the direction of the Z axis is referred to as a −Z direction, and the other side is referred to as a +Z direction. The direction of the Z axis is the direction of the optical axis. The −Z direction is a counter-object side of the camera module 2. The +Z direction is an object side of the camera module 2. The first axis R1 and the second axis R2 are inclined by 45 degrees with respect to the X axis and the Y axis around the Z axis (around the optical axis).

As illustrated in FIG. 2, the optical unit 1 with shake-correction function includes a movable body 10 that includes the camera module 2, and a fixed body 11 that surrounds the movable body 10 from the outside. The fixed body 11 includes the cover 4 and the base 5. As illustrated in FIG. 3, the optical unit main body 3 includes a rotational support structure 12 and a gimbal mechanism 13. The rotational support structure 12 supports the movable body 10 so as to be rotatable around the Z axis. The gimbal mechanism 13 supports the rotational support structure 12 so as to be rotatable around the first axis R1 and the second axis R2.

The gimbal mechanism 13 includes a gimbal frame 15, and a first connecting mechanism 16 that connects the gimbal frame 15 and the rotational support structure 12 so as to be rotatable around the first axis R1. The first connecting mechanism 16 is provided on both sides of the gimbal frame 15 in the direction of the first axis R1. Further, the gimbal mechanism 13 includes a second connecting mechanism 17 that connects the gimbal frame 15 and the fixed body 11 so as to be rotatable around the second axis R2. The second connecting mechanism 17 is provided on both sides of the gimbal frame 15 in the direction of the second axis R2. Accordingly, the movable body 10 is supported by the fixed body 11 in a state of being rotatable around the first axis R1 and the second axis R2 via the rotational support structure 12 and the gimbal mechanism 13.

Further, the optical unit main body 3 includes a shake corrective-magnet drive structure 20 for rotating the movable body 10 around the first axis R1 and around the second axis R2. The shake corrective-magnet drive structure 20 includes a first shake corrective-magnet drive structure 21 that generates a driving force around the Y axis with respect to the movable body 10, and a second shake corrective-magnet drive structure 22 that generates a driving force around the X axis with respect to the movable body 10. The first shake corrective-magnet drive structure 21 and the second shake corrective-magnet drive structure 22 are arranged in the circumferential direction around the Z axis. In the present example, the first shake corrective-magnet drive structure 21 is disposed in the −X direction of the camera module 2. The second shake corrective-magnet drive structure 22 is disposed in the −Y direction of the camera module 2.

The movable body 10 rotates around the X axis and the Y axis by combining the rotation around the first axis R1 and the rotation around the second axis R2. Accordingly, the optical unit 1 with shake-correction function performs pitching correction around the X axis, yawing correction around the Y axis, and rolling correction around the Z axis.

Further, the optical unit main body 3 includes a rolling corrective-magnet drive structure 23 for rotating the movable body 10 around the Z axis. The first shake corrective-magnet drive structure 21, the second shake corrective-magnet drive structure 22, and, and the rolling corrective-magnet drive structure 23 are arranged in the circumferential direction around the Z axis. In the present example, the rolling corrective-magnet drive structure 23 is disposed in the +Y direction of the camera module 2. The rolling corrective-magnet drive structure 23 is located on the side opposite to the second shake corrective-magnet drive structure 22 with the optical axis L interposed therebetween.

Movable Body

Figure 8:
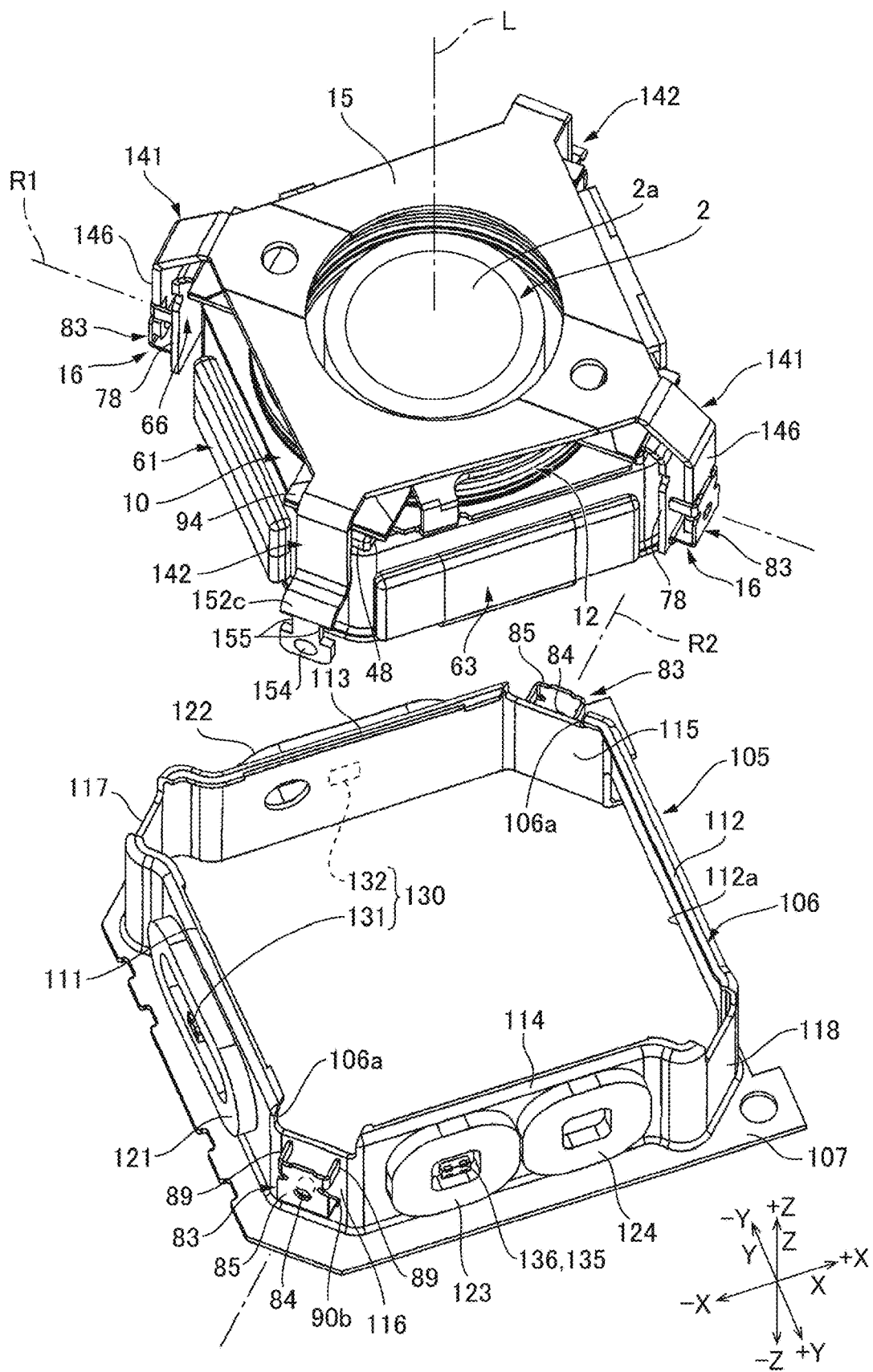
FIG. 8 is an exploded perspective view of the optical unit main body.
Figure 9:
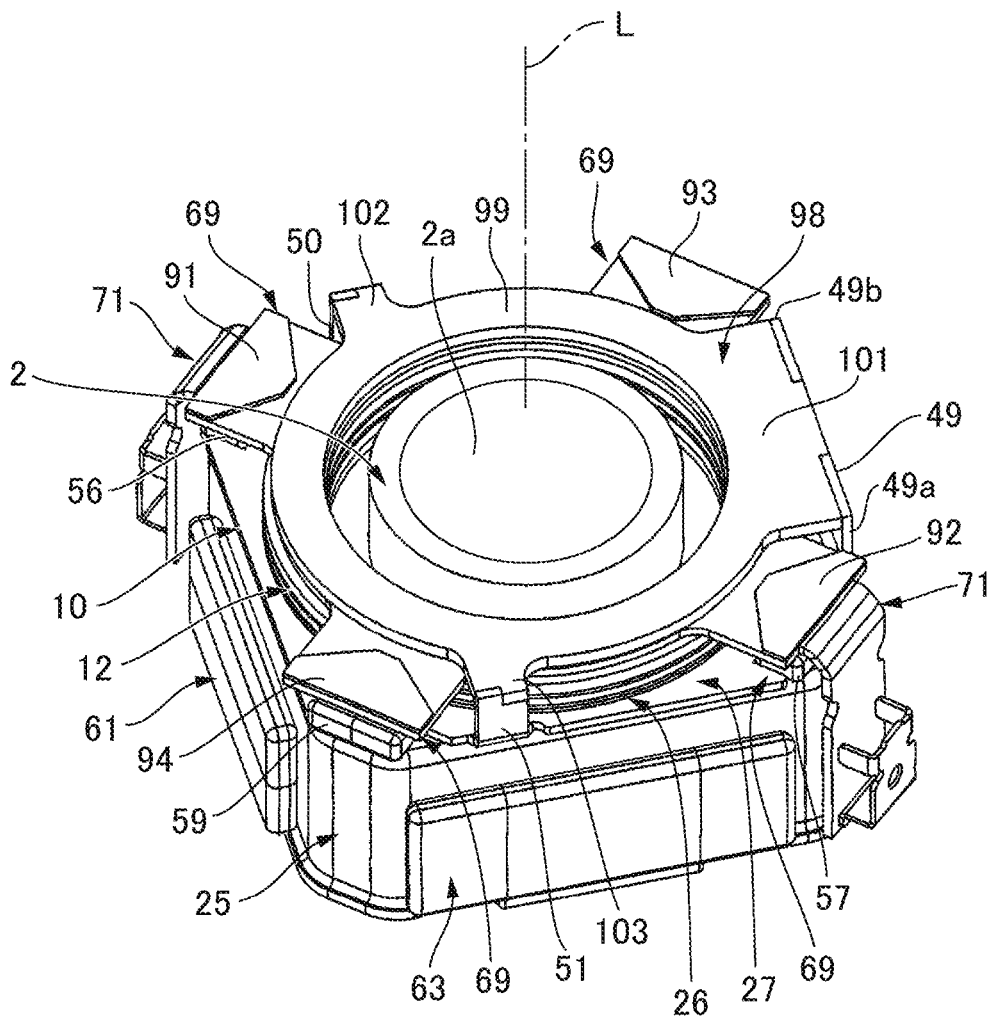
FIG. 9 is a perspective view of a movable body and a rotational support structure.
Figure 9:
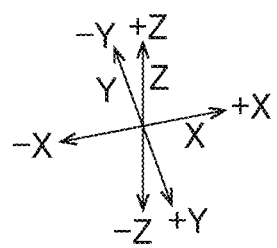
Figure 10:
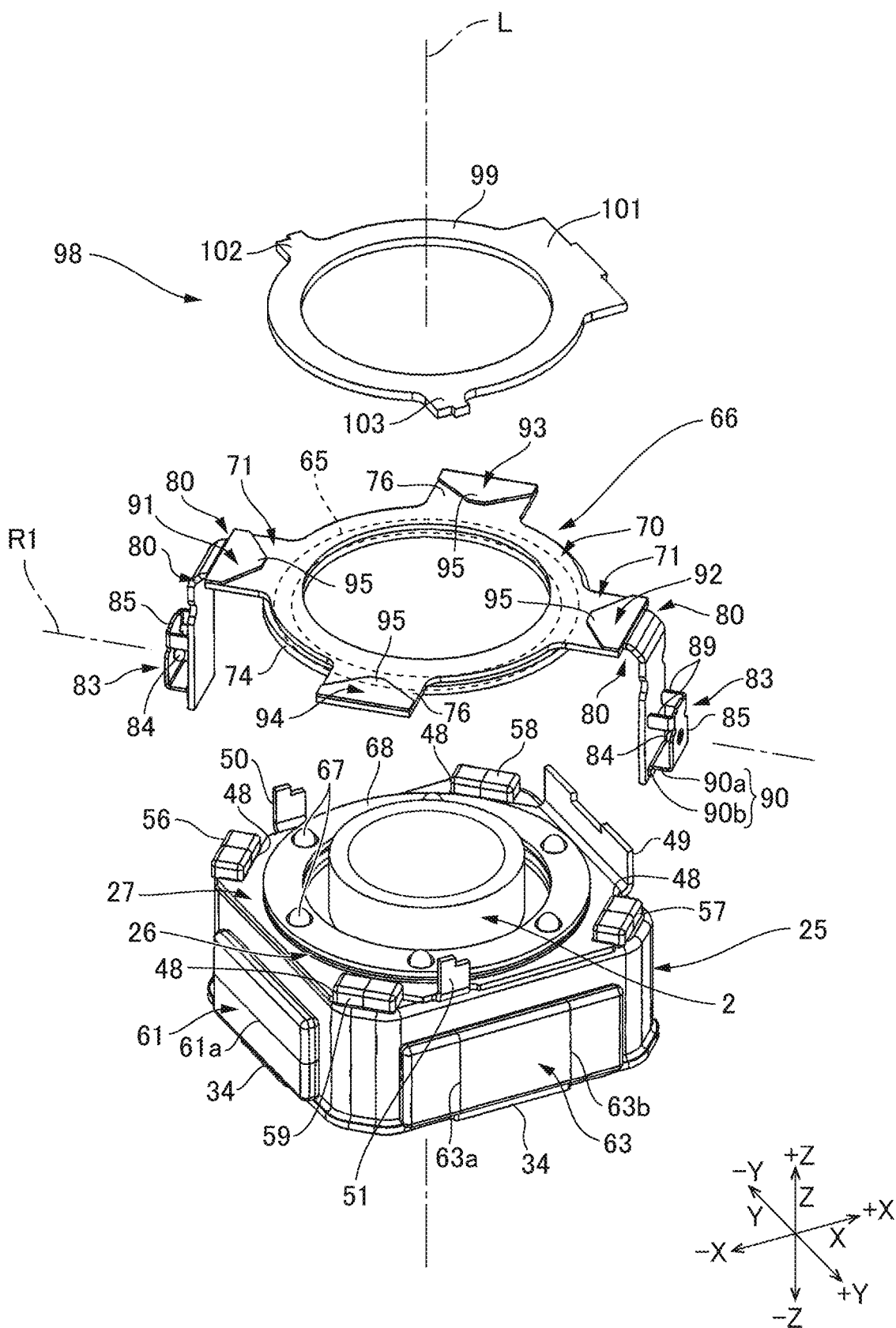
FIG. 10 is an exploded perspective view of the movable body and the rotational support structure.
Figure 11:
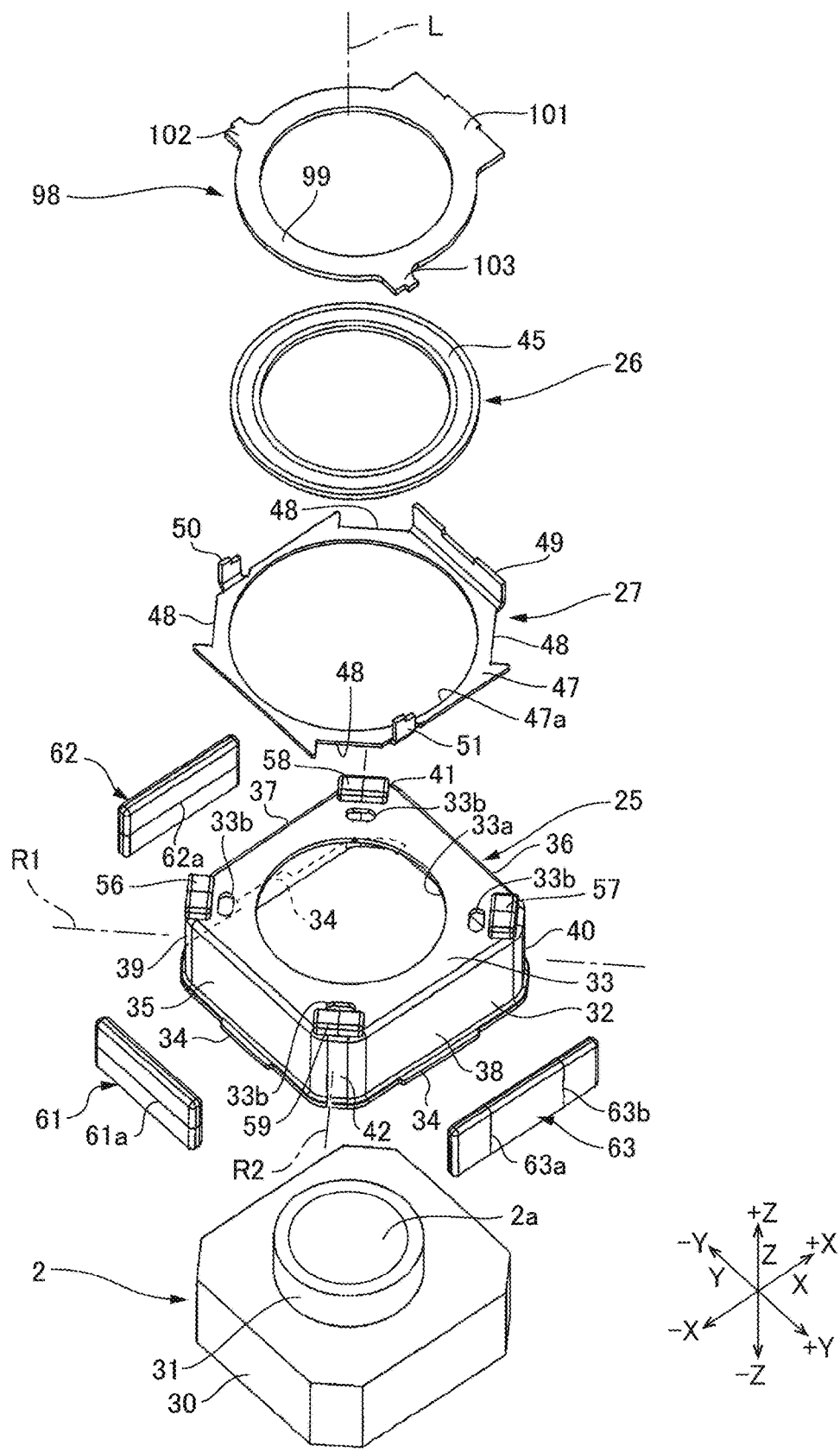
FIG. 11 is an exploded perspective view of the movable body.
Figure 12:
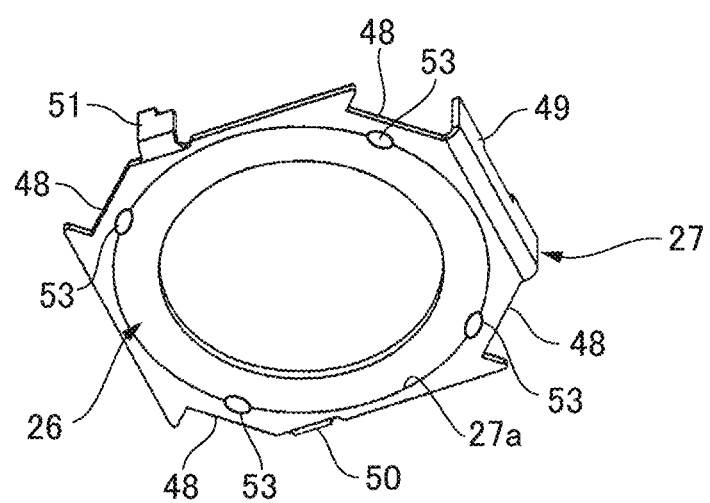
FIG. 12 is a perspective view of a first rail member and a stopper mechanism.
Figure 12:
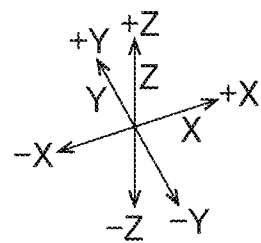
Figure 13:
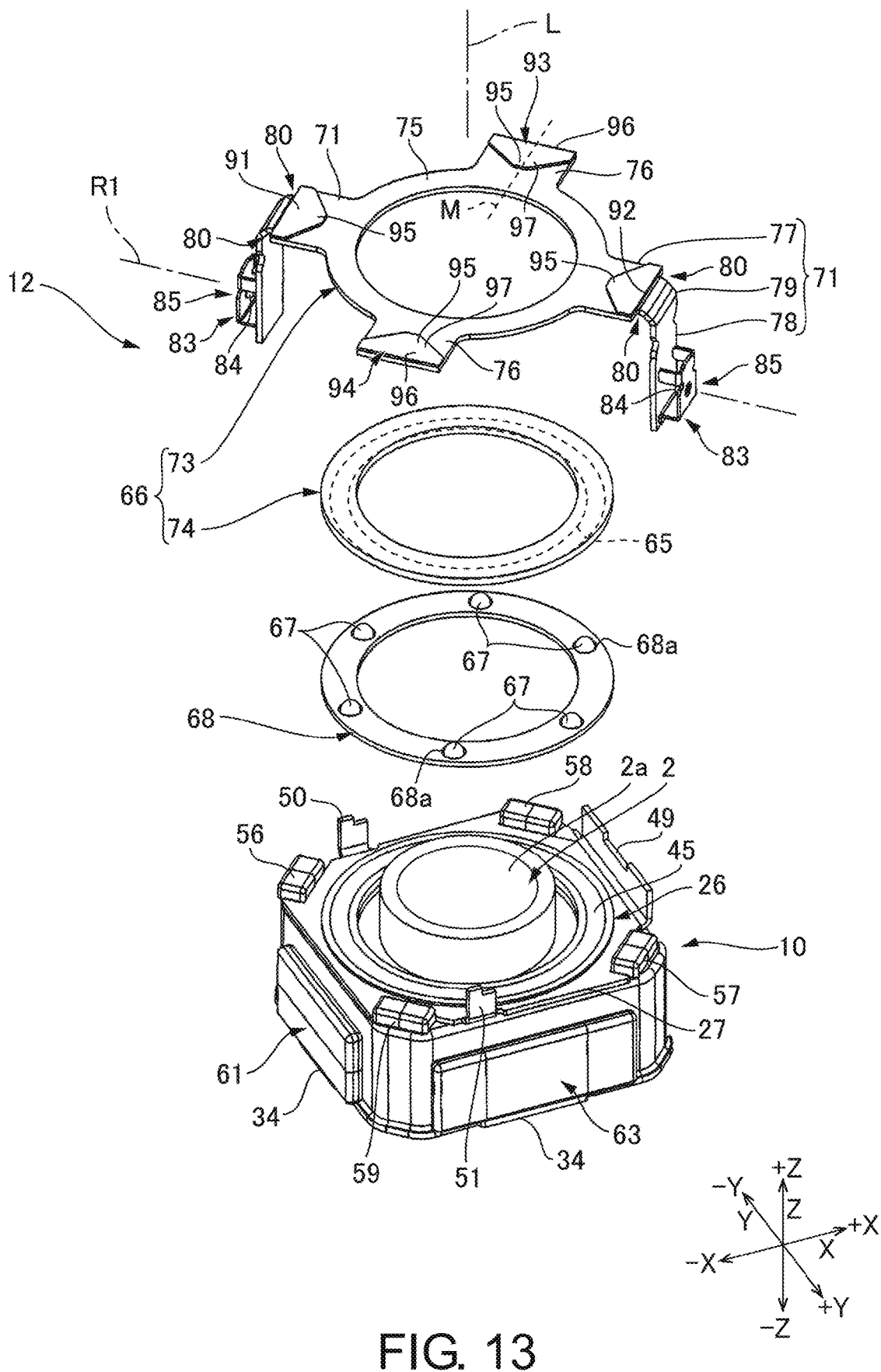
FIG. 13 is an exploded perspective view of the rotational support structure when viewed from an object side.
Figure 14:
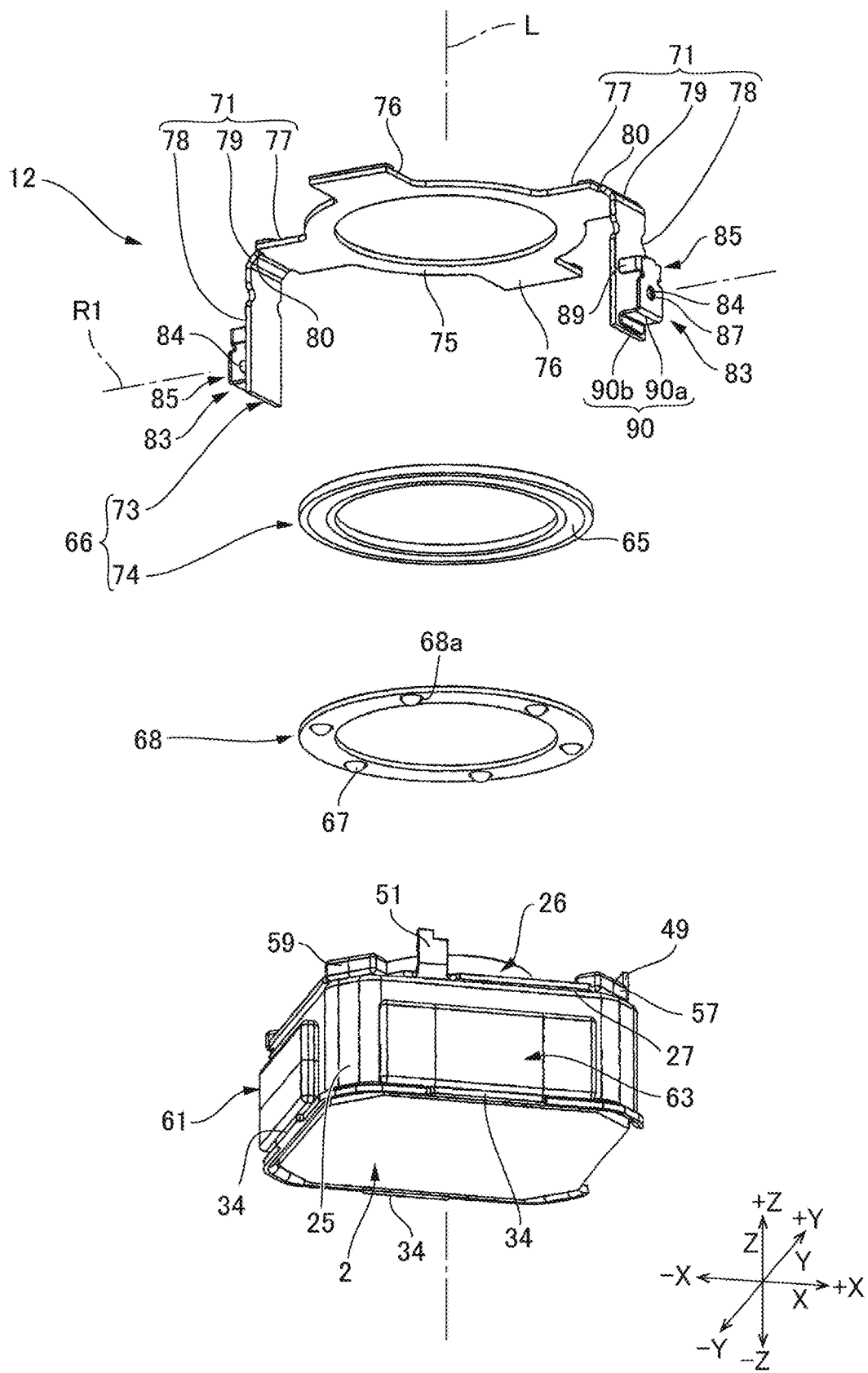
FIG. 14 is an exploded perspective view of the rotational support structure when viewed from the counter object side.

FIG. 8 is an exploded perspective view of the optical unit main body 3. FIG. 9 is a perspective view of the movable body 10 and the rotational support structure 12. FIG. 10 is an exploded perspective view of the movable body 10 and the rotational support structure 12. FIG. 11 is an exploded perspective view of the movable body. FIG. 12 is a perspective view of the first rail member and the stopper mechanism. In FIG. 12, the first rail member and the stopper mechanism are viewed from the −Z direction. FIG. 13 is an exploded perspective view of the rotational support structure 12 and the movable body 10 when viewed from the +Z direction. FIG. 14 is an exploded perspective view of the rotational support structure 12 and the movable body 10 when viewed from the −Z direction.

As illustrated in FIGS. 10 and 11, the movable body 10 includes the camera module 2, a holder 25 that holds the camera module 2, a first rail member 26 that is fixed to the holder 25, and a stopper mechanism 27 that is fixed to the holder 25.

As illustrated in FIG. 11, the camera module 2 includes a camera module main body portion 30, and a camera module cylindrical portion 31 that protrudes from the center of the camera module main body portion 30 in the +Z direction. The lens 2a is accommodated in the camera module cylindrical portion 31. The holder 25 includes a holder frame portion 32 that surrounds the camera module main body portion 30 from the outer circumference side, a holder end plate portion 33 with a frame shape that bends from the end of the holder frame portion 32 in the +Z direction toward the inner circumferential side, and a holder flange portion 34 that bends from the end of the holder frame portion 32 in the −Z direction toward the outer circumference side. The holder 25 is made of magnetic metal.

The holder end plate portion 33 includes a circular opening 33a coaxial with the optical axis L. The camera module cylindrical portion 31 penetrates the circular opening 33a. The holder end plate portion 33 extends in a direction orthogonal to the optical axis L along the surface of the camera module main body portion 30 in the +Z direction. The holder end plate portion 33 includes through-holes 33b that penetrate the holder end plate portion 33 in the direction of the Z axis at both sides of the first axis R1 where the sides sandwich the circular opening 33a. Further, the holder end plate portion 33 includes the through-holes 33b that penetrate the holder end plate portion 33 in the direction of the Z axis at both sides of the second axis R2 where the sides sandwich the circular opening 33a.

The holder frame portion 32 has an approximately octagonal shape when viewed from the +Z direction. The holder frame portion 32 includes a first side wall 35 and a second side wall 36 which extend parallel to the Y direction, and a third side wall 37 and a fourth side wall 38 which extend parallel to the X direction. The first side wall 35 is located in the −X direction of the second side wall 36. The third side wall 37 is located in the −Y direction of the fourth side wall 38. Further, the holder frame portion 32 includes a fifth side wall 39 and a sixth side wall 40 which are located diagonally in the direction of the first axis R1 direction, and a seventh side wall 41 and an eighth side wall 42 which are located diagonally in the direction of the second axis R2. The fifth side wall 39 is located in the −X direction of the sixth side wall 40. The seventh side wall 41 is located in the −Y direction of the eighth side wall 42.

The holder flange portion 34 is provided on the first side wall 35, the third side wall 37 (see FIG. 14), and the fourth side wall 38. The holder flange portion 34 protrudes in a direction orthogonal to the optical axis L.

The first rail member 26 has an annular shape, and is made of non-magnetic metal. A first annular groove 45 is provided on the end surface of the first rail member 26 in the +Z direction. In the present example, the first annular groove 45 is formed by cutting.

The stopper mechanism 27 is made of non-magnetic metal. The stopper mechanism 27 includes a board 47 having an opening 47a to which the first rail member 26 is fitted in the center thereof. The board 47 includes notches 48 at two outer circumferential side portions that overlap with the first axis R1 when viewed from the direction of the Z axis on the edge of the outer circumferential side. Further, the board 47 includes notches 48 at two outer circumferential side portions that overlap with the second axis R2 when viewed from the direction of the Z axis on the edge of the outer circumferential side. Further, the stopper mechanism 27 includes, on the edge of the outer circumferential side of the board 47, a first bent portion 49 that bends in the +Z direction from the edge of the outer circumferential side portion located in the +X direction of the opening 47a, and a second bent portion 50 that bends in the +Z direction from the edge of the outer circumferential side portion located in the −Y direction of the opening 47a, and a third bent portion 51 that bends in the +Z direction from the edge of the outer circumferential side portion located in the +Y direction of the opening 47a. The first bent portion 49 has a width in the circumferential direction that is longer than that of each of the second bent portion 50 and the third bent portion 51.

As illustrated in FIGS. 12 and 13, the first rail member 26 is fixed to the stopper mechanism 27 by welding in a state of being fitted into the opening 47a of the stopper mechanism 27. Thereafter, the first rail member 26 is fixed to the holder end plate portion 33 by welding together with the stopper mechanism 27.

More specifically, in the first rail member 26 and the stopper mechanism 27, the opening edge of the opening 47a of the stopper mechanism 27 and the edge of the outer circumferential side of the first rail member 26 are welded from the −Z direction. Further, the welding is performed at four locations at equal angular intervals around the Z axis. As a result, as illustrated in FIG. 12, four welding marks 53, which fix the first rail member 26 and the stopper mechanism 27 to each other, are provided on the surface of the first rail member 26 and the stopper mechanism 27 on the side of the holder end plate portion 33.

Next, the first rail member 26 and the stopper mechanism 27, which are integrated by welding, are welded to the holder end plate portion 33. Here, when the first rail member 26 and the stopper mechanism 27 are welded to the holder end plate portion 33, the four welding marks 53 are inserted into the four through-holes 33b (see FIG. 11) of the holder end plate portion 33, respectively. Accordingly, the welding marks 53 are received in the through-holes 33b, respectively. Therefore, the first rail member 26 and the stopper mechanism 27 are fixed to the holder 25 in a state of being in close contact with the holder end plate portion 33. In a state in which the first rail member 26 and the stopper mechanism 27 are fixed to the holder 25, as illustrated in FIG. 13, the first rail member 26 is perpendicular to the optical axis, and the first annular groove 45 is coaxial with the optical axis L.

Further, a first magnet 56, a second magnet 57, a third magnet 58, and a fourth magnet 59 are fixed to the holder end plate portion 33. The first magnet 56, the second magnet 57, the third magnet 58, and the fourth magnet 59 are arranged at four locations at equal angular intervals in the circumferential direction around the Z axis. The first magnet 56 and the second magnet 57 are fixed to the edge portions on both sides of the circular opening 33a in the direction of the first axis R1 in the holder end plate portion 33. The third magnet 58 and the fourth magnet 59 are fixed to the edge portions on both sides of the circular opening 33a in the direction of the second axis R2 in the holder end plate portion 33. Each of the magnets 56 to 59 is magnetized with two poles in the circumferential direction. The magnetic polarization lines of the magnets 56 to 59 extend in the radial direction from the respective centers of the magnets 56 to 59 in the circumferential direction.

Here, the first magnet 56, the second magnet 57, the third magnet 58, and the fourth magnet 59 are fixed to the holder end plate portion 33 after the first rail member 26 and the stopper mechanism 27 are welded to the holder end plate portion 33. When the first magnet 56 and the second magnet 57 are fixed to the holder end plate portion 33, the magnets 56 and 57 are brought into contact with the opening edges of each of the notches 48, which are provided on both sides of the board 47 of the stopper mechanism 27 in the direction of the first axis R1, respectively. Further, when the third magnet 58 and the fourth magnet 59 are fixed to the holder end plate portion 33, the magnets 58 and 59 are brought into contact with the opening edges of each of the notches 48, which are provided on both sides of the board 47 of the stopper mechanism 27 in the direction of the second axis R2, respectively. As a result, each of the magnets 56 to 59 is positioned on the movable body 10 in the circumferential direction and in the radial direction.

As illustrated in FIG. 11, a first shake corrective magnet 61 is fixed to the first side wall 35 of the holder frame portion 32. The first shake corrective magnet 61 is magnetized with two poles in the direction of the Z axis. A magnetic polarization line 61a of the first shake corrective magnet 61 extends in the circumferential direction. A second shake corrective magnet 62 is fixed to the third side wall 37. The second shake corrective magnet 62 is magnetized with two poles in the direction of the Z axis. A magnetic polarization line 62a of the second shake corrective magnet 62 extends in the circumferential direction. The first shake corrective magnet 61 and the second shake corrective magnet 62 are arranged so as to point the same pole in the direction of the Z axis.

A rolling corrective magnet 63 is fixed to the fourth side wall 38. The rolling corrective magnet 63 is magnetized with three poles in the circumferential direction. The rolling corrective magnet 63 includes a first magnetic polarization line 63a and a second magnetic polarization line 63b that extend in parallel to the direction of the Z axis. The first magnetic polarization line 63a is located in the −X direction of the second magnetic polarization line 63b. The rolling corrective magnet 63 is disposed on the side opposite to the second shake corrective magnet 62 with the optical axis L interposed therebetween.

Here, the first shake corrective magnet 61, the second shake corrective magnet 62, and the rolling corrective magnet 63 abut against the holder flange portion 34 from the +direction of the Z axis. That is, the holder flange portion 34 positions the first shake corrective magnet 61, the second shake corrective magnet 62, and the rolling corrective magnet 63 in the direction of the Z axis.

Note that, as illustrated in FIG. 9, a second stopper mechanism 98 is fixed to the stopper mechanism 27 in the +Z direction. The second stopper mechanism 98 will be described later.

Rotational Support Mechanism

As illustrated in FIGS. 13 and 14, the rotational support structure 12 includes the first annular groove 45 provided on the movable body 10 in a state of being coaxial with the optical axis L, and a plate roller 66 having a second annular groove 65 opposed to the first annular groove 45 in the direction of the Z axis. Further, the rotational support structure 12 includes a plurality of spherical objects 67 which are inserted into the first annular groove 45 and the second annular groove 65 and roll between the movable body 10 and the plate roller 66, and an annular retainer 68 which holds the spherical objects 67 so as to be rollable. Further, as illustrated in FIG. 9, the rotational support structure 12 includes a pressurization structure 69 that applies a force for bringing the first annular groove 45 and the second annular groove 65 closer to each other in the direction of the Z axis.

As illustrated in FIG. 10, the plate roller 66 includes a plate roller annular portion 70 that surrounds the optical axis L, a pair of plate roller extension portions 71 that protrude from the plate roller annular portion 70 toward both sides in the direction of the first axis R1, and a pair of plate roller protruding portions 76 that protrude from the plate roller annular portion 70 toward both sides in the direction of the second axis R2. The second annular groove 65 is provided on the plate roller annular portion 70.

More specifically, as illustrated in FIGS. 13 and 14, the plate roller 66 includes a plate roller main body portion 73 and a second rail member 74 having a second annular groove 65. The plate roller main body portion 73 includes an annular plate portion 75 that surrounds the optical axis L, the pair of plate roller extension portions 71 that protrude from the annular plate portion 75 toward both sides in the direction of the first axis R1, and the pair of plate roller protruding portions 76 that protrude from the annular plate portion 75 toward both sides in the direction of the second axis R2. The second rail member 74 is fixed to the annular plate portion 75, and surrounds the optical axis L.

Both of the second rail member 74 and the plate roller main body portion 73 are made of non-magnetic metal. The second rail member 74 is fixed to the annular plate portion 75 of the plate roller main body portion 73 by welding. As a result, the second rail member 74 and the annular plate portion 75 constitute the plate roller annular portion 70. Here, the second rail member 74 and the first rail member 26 are the same member. The second rail member 74 and the first rail member 26 are disposed coaxially with each other, so that the first annular groove 45 and the second annular groove 65 face each other in the direction of the Z axis.

Each of the spherical objects 67 is made of metal or a ceramic material. The retainer 68 is made of resin. The retainer 68 is located between the first rail member 26 and the second rail member 74 in the direction of the Z axis. The retainer 68 includes a plurality of spherical-object holding holes 68a that hold the spherical objects 67 so as to be rollable, respectively. In the present example, the rotational support structure 12 includes six spherical objects 67. The retainer 68 includes six spherical-object holding holes 68a provided at equal angular intervals. The spherical object 67 is held to be rollable inside the spherical-object holding hole 68a, and protrudes in the −Z direction and the +Z direction from the retainer 68.

Each of the pair of plate roller extension portions 71 includes a first portion of the plate roller extension portion 77 extending from the annular plate portion 75 in the direction of the first axis R1, a second portion of the plate roller extension portion 78 extending the first portion of the plate roller extension portion 77 and the outer circumference side of the movable body 10 toward the direction of the Z axis, and a third portion of the plate roller extension portion 79 connecting the first portion of the plate roller extension portion 77 and the second portion of the plate roller extension portion 78. The third portion of the plate roller extension portion 79 is bent in the −Z direction toward the direction away from the annular plate portion 75 in the direction of the first axis R1.

The first portion of the plate roller extension portion 77 is wider in the circumferential direction than the third portion of the plate roller extension portion 79 and the second portion of the plate roller extension portion 78. When viewed from the direction of the Z axis, steps 80 are provided on both sides in the circumferential direction between the first portion of the plate roller extension portion 77 and the third portion of the plate roller extension portion 79.

As illustrated in FIG. 6, the second portion of the plate roller extension portion 78 faces the movable body 10 with a slight gap on the outside of the movable body 10 in the direction of the first axis R1. As illustrated in FIGS. 6, 13 and 14, a gimbal frame receiving member 83 is fixed to each of the second portions of the plate roller extension portion 78 opposite to the movable body 10. As illustrated in FIG. 4, each of the gimbal frame receiving members 83 includes a spherical object 84 located on the outer circumference side (opposite side of the movable body 10) of each of the second portions of the plate roller extension portion 78, and a thrust receiving member 85 fixed to the second portion of the plate roller extension portion 78 on the outer circumference side. The thrust receiving member 85 fixed to the second portion of the plate roller extension portion 78 supports the spherical object 84 at a position separated from the second portion of the plate roller extension portion 78 on the first axis R1.

Figure 15A:
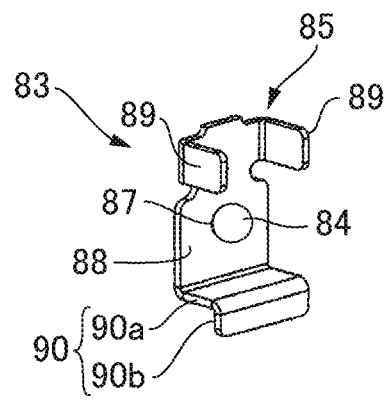
FIGS. 15A and 15B are perspective views of a gimbal frame receiving member.
Figure 15B:
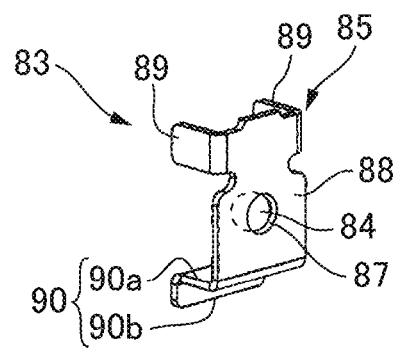

FIGS. 15A and 15B are perspective views of the gimbal frame receiving member. FIG. 15A is a perspective view of the gimbal frame receiving member 83 when viewed from the side where the spherical object 84 is located. FIG. 15B is a perspective view of the gimbal frame receiving member 83 when viewed from the side opposite to the side where the spherical object 84 is located. As illustrated in FIGS. 15A and 15B, the thrust receiving member 85 includes a plate 88 having a spherical object fixing portion 87 to which the spherical object 84 is fixed, a pair of arms 89 protruding to the side where the spherical object 84 is fixed from both ends in the circumferential direction in the +Z direction of the plate 88 from the spherical object fixing portion 87, and a foot 90 protruding from the end of the plate 88 in the −Z direction to the side where the spherical object 84 is fixed.

The plate 88 has a rectangular shape that is long in the direction of the Z axis as a whole. The spherical object fixing portion 87 is a circular through-hole provided in the plate 88. The inner diameter of the through-hole is smaller than the diameter of the spherical object 84. The spherical object 84 is fixed to the thrust receiving member 85 by welding while being partially inserted into the spherical object fixing portion 87. The foot 90 includes a protruding foot plate 90a protruding in a direction orthogonal to the annular plate portion 75 from the end of the plate 88 in the −Z direction, and a bent foot plate 90b bending in the −Z direction from the end of the protruding foot plate 90a on the side opposite to the plate 88. As illustrated in FIGS. 13 and 14, the gimbal frame receiving member 83 is fixed to the distal end of each of the arms 89 of the thrust receiving member 85, and the bent foot plate 90b is fixed to the second portion of the plate roller extension portion 78 by welding.

As illustrated in FIG. 9, the pressurization structure 69 includes a first magnetic component 91, a second magnetic component 92, a third magnetic component 93, and a fourth magnetic component, which are fixed at four locations in the circumferential direction of the plate roller 66, respectively. More specifically, the pressurization structure 69 includes the first magnetic component 91 fixed to one of the first portions of plate roller extension portion 77, and the second magnetic component 92 fixed to the other of the first portions of the plate roller extension portion 77. Further, the pressurization structure 69 includes the third magnetic component 93 fixed to one of the plate roller protruding portions 76, and a fourth magnetic component 94 fixed to the other of the plate roller protruding portions 76. The first magnetic component 91, the second magnetic component 92, the third magnetic component 93, and the fourth magnetic component 94 are the same component.

As illustrated in FIG. 13, the shape of each of the magnetic components 91 to 94 when viewed from the direction of the Z axis is symmetrical with respect to a virtual line M, which extends in the radial direction at the center in the circumferential direction. Further, each of the magnetic components 91 to 94 includes a wide portion 95 having a width in the radial direction wider than both ends in the circumferential direction at the center in the circumferential direction. The width of each of the magnetic components 91 to 94 in the radial direction gradually increases from both of the ends toward the wide portion 95. In the present example, each of the magnetic components 91 to 94 includes a rectangular portion 96 that is long in the circumferential direction and has a rectangular shape, and a trapezoidal portion 97 that is tapered inward in the radial direction from an edge on the inner circumferential side of the rectangular portion 96.

The first magnetic component 91 and the second magnetic component 92 are fixed to the plate roller extension portion 71 in the +Z direction (the side opposite to the holder end plate portion 33 in the direction of the Z axis). The third magnetic component 93 and the fourth magnetic component 94 are fixed to the plate roller protruding portion 76 in the +Z direction (the side opposite to the holder end plate portion 33 in the direction of the Z axis).

When a state in which the first magnetic component 91 and the second magnetic component 92 are fixed to the first portion of the plate roller extension portion 77 is viewed from the direction of the Z axis, both edges of the first magnetic component 91 and the second magnetic component 92 in the circumferential direction overlap with both edges of the first portion of the plate roller extension portion 77 in the circumferential direction. Further, a portion of the edge of the outer circumference side of the first magnetic component 91 and the second magnetic component 92 overlaps with the contour of the step 80 of the plate roller extension portion 71. Further, when a state in which the third magnetic component 93 and the fourth magnetic component 94 are fixed to the plate roller protruding portion 76 is viewed from the direction of the Z axis, both edges of the third magnetic component 93 and the fourth magnetic component 94 in the circumferential direction overlap with both edges of the plate roller protruding portion 76 in the circumferential direction. Further, the edge of the outer circumferential side of the third magnetic component 93 and the fourth magnetic component 94 overlap with the edge of the outer circumferential side of the plate roller protruding portion 76. That is, the shape of each of the first portions of the plate roller extension portion 77 functions as a positioning portion for positioning the first magnetic component 91 and the second magnetic component 92 in the circumferential direction and the radial direction. Further, the shape of the plate roller protruding portion 76 functions as a positioning portion for positioning the third magnetic component 93 and the fourth magnetic component 94 in the circumferential direction and the radial direction.

Further, as illustrated in FIGS. 6, 7, and 13, the pressurization structure 69 includes four magnets 56 to 59 fixed to the holder end plate portion 33 of the holder 25 of the movable body 10. Each of the four magnets 56 to 59 is arranged at the same angular position when the movable body 10 and the plate roller annular portion 70 of the plate roller 66 are overlapped with each other. That is, each of the magnets 56 to 59 overlaps with each of the four magnetic components 91 to 94 when viewed from the direction of the Z axis.

Here, as illustrated in FIG. 10, the notch 48 provided on one side of the board 47 of the stopper mechanism 27 in the direction of the first axis R1 serves as a first positioning portion for arranging the first magnet 56 at a position overlapping with the first magnetic component 91 when viewed from the direction of the Z axis. The notch 48 provided on the other side of the board 47 of the stopper mechanism 27 in the direction of the first axis R1 serves as a second positioning portion for arranging the second magnet 57 at a position overlapping with the second magnetic component 92 when viewed from the direction of the Z axis. The notch 48 provided on one side of the board 47 of the stopper mechanism 27 in the direction of the second axis R2 serves as a third positioning portion for arranging the third magnet 58 at a position overlapping with the third magnetic component 93 when viewed from the direction of the Z axis. The notch 48 provided on the other side of the board 47 of the stopper mechanism 27 in the direction of the second axis R2 serves as a fourth positioning portion for arranging the fourth magnet 59 at a position overlapping with the fourth magnetic component 94 when viewed from the direction of the Z axis.

The magnets 56 to 59 attract the magnetic components 91 to 94 that overlap with the respective magnets 56 to 59 in the direction of the Z axis, respectively. Accordingly, the pressurization structure 69 applies a force for bringing the first annular groove 45 and the second annular groove 65 closer to each other in the direction of the Z axis at four positions at equal angular intervals around the optical axis L. The movable body 10 is attracted to the plate roller 66 by the magnetic attraction force between each of the magnetic components 91 to 94 of the pressurization structure 69 and each of the magnets 56 to 59, and is supported by the plate roller 66 in a state of being rotatable around the Z axis.

Here, as illustrated in FIG. 9, when the movable body 10 is supported by the plate roller 66 in a state of being rotatable around the Z axis, the first bent portion 49 of the stopper mechanism 27 has a first-side stopper part 49a that faces one of the plate roller extension portions 71 with a gap from one side in the circumferential direction. The first-side stopper part 49a is an edge on one side of the first bent portion 49 in the circumferential direction. Further, the first bent portion 49 of the stopper mechanism 27 includes a second-side stopper part 49b that faces one of the plate roller protruding portions 76 with a gap from the other side in the circumferential direction. The second-side stopper part 49b is an edge on the other side of the first bent portion 49 in the circumferential direction.

Further, the movable body 10 includes a second stopper mechanism 98 fixed to the stopper mechanism 27. As illustrated in FIG. 10, the second stopper mechanism 98 includes an annular stopper part 99 surrounding the optical axis, a first connecting part 100 with a substantially rectangular shape protruding from the stopper part 99 in the +X direction, a second connecting part 101 protruding from the stopper part 99 in the −Y direction, and a third connecting part 102 protruding from the stopper part 99 in the +Y direction. In the second stopper mechanism 98, the first connecting part 100 is connected to the end of the first bent portion 49 of the stopper mechanism 27 in the +Z direction, the second connecting part 101 is connected to the end of the second bent portion 50 of the stopper mechanism 27 in the +Z direction, the third connecting part 102 is connected to the end of the third bent portion 51 of the stopper mechanism 27 in the +Z direction, and these are fixed by welding.

As illustrated in FIGS. 6 and 7, when the second stopper mechanism 98 is fixed to the stopper mechanism 27, the stopper part 99 faces the plate roller annular portion 70 with a predetermined gap from the direction of the Z axis on the side opposite to the second annular groove 65 of the plate roller annular portion 70 in the direction of the Z axis. The stopper part 99 prevents the movable body 10 from falling out from the plate roller 66 in the −Z direction.

Fixed Body

As illustrated in FIG. 8, the fixed body 11 includes a case 105 with a frame shape that surrounds the movable body 10 and the rotational support structure 12 from the outer circumference side. As illustrated in FIG. 1, the cover 4 covers the case 105 from the +Z direction. As illustrated in FIG. 3, the base 5 closes an opening of the case 105 in the −Z direction. The case 105, the cover 4, and the base 5 are made of metal. The cover 4 and the base 5 are fixed to the case 105 by welding.

The case 105 is made of non-magnetic metal. As illustrated in FIG. 8, the case 105 includes a frame plate portion 106 that surrounds the holder 25 from the outside in the radial direction, and a fixed body-side flange portion 107 that bends from the end of the frame plate portion 106 in the −Z direction and protrudes toward the outer circumference side. The frame plate portion 106 is oriented toward the thickness direction in the radial direction. The base 5 is fixed to the fixed body-side flange portion 107.

The frame plate portion 106 includes a first frame plate portion 111 extending toward the direction of the Y axis in the −X direction of the movable body 10, a second frame plate portion 112 extending toward the direction of the Y axis in the +X direction of the movable body 10, a third frame plate portion 113 extending toward the direction of the X axis in the −Y direction of the movable body 10, and a fourth frame plate portion 114 extending toward the direction of the X axis in the +Y direction of the movable body 10. In the frame plate portion 106, the second frame plate portion 112 and the third frame plate portion 113 are connected to each other by a fifth frame plate portion 115, which is inclined by 45 degree with respect to the second frame plate portion 112 and the third frame plate portion 113. In the frame plate portion 106, the first frame plate portion 111 and the fourth frame plate portion 114 are connected to each other by a sixth frame plate portion 116, which is inclined by 45 degree with respect to the first frame plate portion 111 and the fourth frame plate portion 114. The fifth frame plate portion 115 and the sixth frame plate portion 116 face each other in the direction of the second axis R2. The fifth frame plate portion 115 and the sixth frame plate portion 116 have a rectangular notch portion 106a at the end in the +Z direction. That is, the case 105 includes, in the edge in the +Z direction, the notch portion 106a in a portion overlapping with the second axis R2 when viewed from the direction of the Z axis.

The first frame plate portion 111 and the third frame plate portion 113 are connected by a seventh frame plate portion 117, which protrudes outward in the direction of the first axis R1. Therefore, the first frame plate portion 111 is offset from the seventh frame plate portion 117 in the +X direction. Further, the third frame plate portion 113 is offset from the seventh frame plate portion 117 in the +Y direction. The seventh frame plate portion 117 has a bent shape in which the direction of the first axis R1 protrudes toward the outer circumference side, then extends in the circumferential direction, and the direction of the first axis R1 bends toward the inner circumferential side. The fourth frame plate portion 114 and the second frame plate portion 112 are connected to each other by an eighth frame plate portion 118, which protrudes outward from the fourth frame plate portion 114 in the direction of the first axis R1. The fourth frame plate portion 114 is offset from the eighth frame plate portion 118 in the −Y direction. When viewed from the direction of the Z axis, the eighth frame plate portion 118 protrudes outward from the fourth frame plate portion 114 in the direction of the first axis R1, then extends in the circumferential direction, and is connected to the second frame plate portion 112.

A notch 112a with a rectangular shape is provided at an edge of the second frame plate portion 112 in the −Z direction. Here, a flexible printed board (not illustrated) is drawn out from the camera module 2 in the +X direction. The flexible printed board is drawn out to the outside of the case 105 via the notch 112a.

The gimbal frame receiving members 83 are fixed to an outer end face of the fifth frame plate portion 115 and an outer end face of the sixth frame plate portion 116, respectively. Each of the gimbal frame receiving members 83 is the same member as the gimbal frame receiving member 83 fixed to the second portion of the plate roller extension portion 78. Each of the gimbal frame receiving members 83 includes the spherical object 84 located on the outer circumference side of the frame plate portion 106 (on the side opposite to the movable body 10), and the thrust receiving member 85 that is fixed to the frame plate portion 106 on the outer circumference side and supports the spherical object 84 at a position separated from the frame plate portion 106 on the second axis R2. In each of the gimbal frame receiving members 83, the distal end of each of the arms 89 of the thrust receiving member 85 and the bent foot plate 90b are fixed by welding to the fifth frame plate portion 115 and the sixth frame plate portion 116, respectively.

A first shake-correction coil 121 is fixed to an outer surface of the first frame plate portion 111 (a surface on the side opposite to the movable body 10). A second shake-correction coil 122 is fixed to the outer surface of the third frame plate portion 113. Further, two rolling corrective coils 123 and 124 are fixed to the outer side surface of the fourth frame plate portion 114. The two rolling corrective coils 123 and 124 are arranged in the circumferential direction. Here, as illustrated in FIG. 3, the flexible printed board 9 is routed along the first frame plate portion 111, and the fourth frame plate portion 114 on the outer circumference side of the first shake-correction coil 121, the second shake-correction coil 122, and the two rolling corrective coils 123 and 124. The first shake-correction coil 121, the second shake-correction coil 122, and the two rolling corrective coils 123 and 124 are electrically connected to the flexible printed board 9.

An oscillation position sensor 130 of the shake corrective-magnet drive structure 20 is provided on the flexible printed board 9. As illustrated in FIG. 8, the oscillation position sensor 130 includes a first Hall element 131 arranged at a position overlapping with the opening of the first shake-correction coil 121, and a second Hall element 132 arranged at a position overlapping with the opening of the second shake-correction coil 122, when viewed from the radial direction. The oscillation position sensor 130 detects an oscillation angle around the X axis of the movable body 10 on the basis of the output of the second Hall element 132 disposed at a position overlapping with the opening of the second shake-correction coil 122. Further, the oscillation position sensor 130 detects the oscillation angle around the Y axis of the movable body 10 on the basis of the output of the first Hall element 131 disposed at a position overlapping with the opening of the first shake-correction coil 121.

Further, the flexible printed board 9 is provided with a rotational position sensor 135 of the rolling corrective-magnet drive structure 23. The rotational position sensor 135 includes a Hall element 136 that overlaps with the opening of the rolling corrective coils 123 when viewed from the radial direction. The rotational position sensor 135 detects the angular position of the movable body 10 around the Z axis based on the output of the Hall element 136.

Further, as illustrated in FIG. 3, in the flexible printed board 9, a first magnetic plate 137 with a rectangular shape is fixed on the outer circumference side of the first shake-correction coil 121. Further, in the flexible printed board 9, a second magnetic plate 138 with a rectangular shape is disposed on the outer circumference side of the second shake-correction coil 122.

Gimbal Frame

Figure 16:
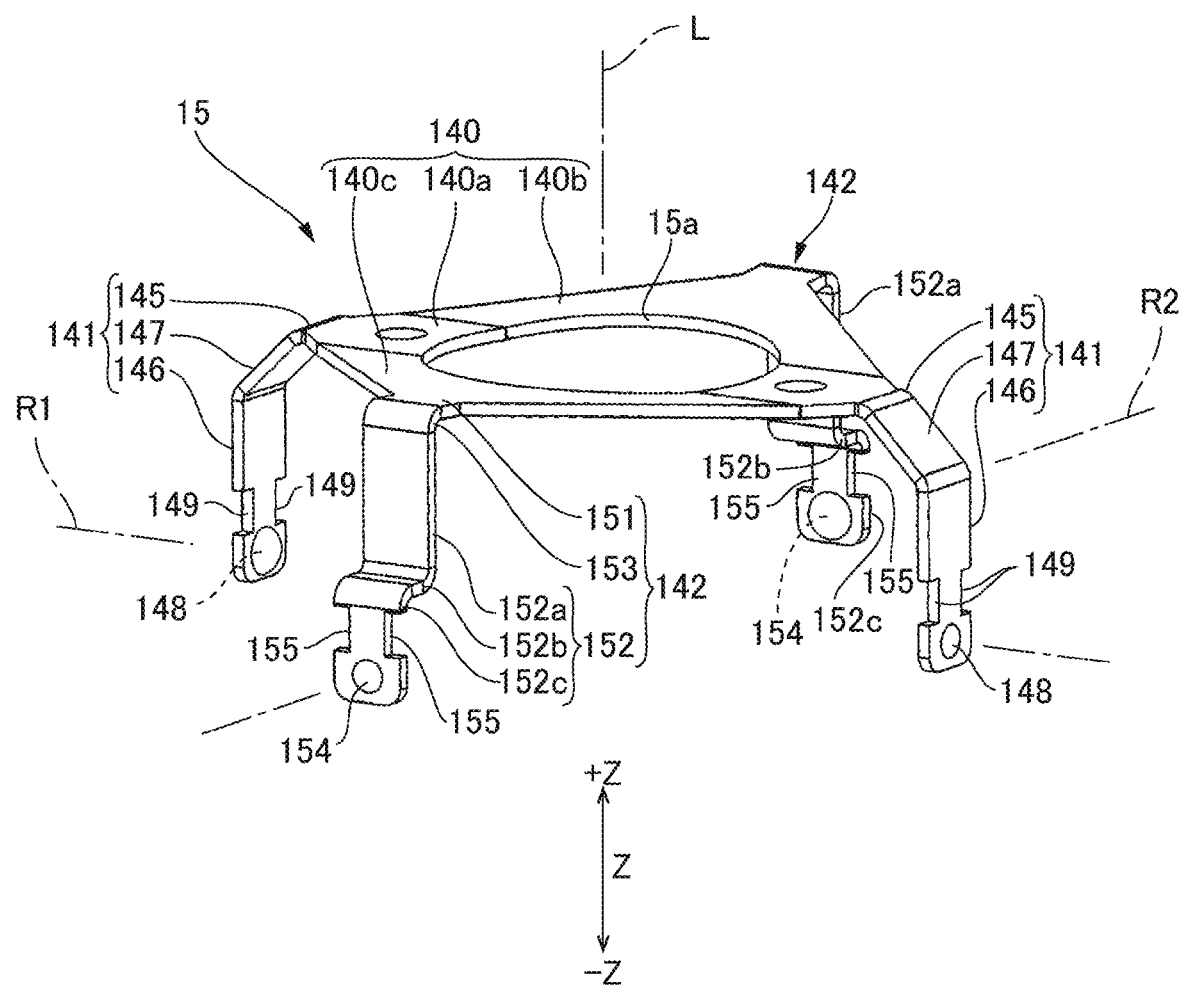
FIG. 16 is a perspective view of a gimbal frame.

FIG. 16 is a perspective view of the gimbal frame 15. The gimbal frame 15 is made of a metal leaf spring. As illustrated in FIG. 8, the gimbal frame 15 includes a main body 140 located in the +Z direction of the plate roller 66, a pair of first axis-side extension parts 141 that protrude from the main body 140 toward both sides in the direction of the first axis R1 and extends in the −Z direction, and a pair of second axis-side extension parts 142 that protrude from the main body 140 toward both sides in the direction of the second axis R2 and extends in the −Z direction. As illustrated in FIG. 14, the main body 140 includes a central portion 140a with a substantially rectangular shape that extends in the direction of the first axis R1, a first inclined portion 140b that is inclined in the +Z direction from one side of the central portion 140a in the direction of the second axis R2 (−Y direction side) toward the outer circumference side, and a second inclined portion 140c that is inclined in the +Z direction from the other side of the central portion 140a in the direction of the second axis R2 (+Y direction side) toward the outer circumference side. Further, the main body 140 includes an opening 15a, which penetrates in the direction of the Z axis in the center. As illustrated in FIG. 8, the camera module cylindrical portion 31 of the camera module 2 is located inside the opening 15a when viewed from the direction of the Z axis.

As illustrated in FIG. 16, each of the pair of first axis-side extension parts 141 includes a first portion of the first axis-side extension part 145 that extends in a direction away from the main body 140 in the direction of the first axis R1, a second portion of the first axis-side extension part 146 that extends the outer circumference side of the first portion of the first axis-side extension part 145 and the movable body 10 in the direction of the Z axis, and a third portion of the first axis-side extension part 147 that connects the first portion of the first axis-side extension part 145 and the second portion of the first axis-side extension part 146.

The first portion of the first axis-side extension part 145 protrudes from the central portion 140a in the direction of the first axis R1. The third portion of the first axis-side extension part 147 is inclined in the −Z direction from the leading edge of the first portion of the first axis-side extension part 145 toward the outer circumference side. The second portion of the first axis-side extension part 146 includes a first axis-side recessed curved surface 148 that recesses the direction of the first axis R1 in the inner circumference side toward the side of the movable body 10 on the first axis R1. Further, the second portion of the first axis-side extension part 146 includes a pair of rectangular notches 149 formed by cutting out edges on both ends in the circumferential direction in the +Z direction of the first axis-side recessed curved surface 148. By providing the pair of notches 149, the second portion of the first axis-side extension part 146 is provided with a portion having a narrow width in the circumferential direction in the +Z direction of the first axis-side recessed curved surface 148.

Next, each of the pair of second axis-side extension parts 142 includes a first portion of the second axis-side extension part 151 that extends in a direction away from the main body 140 in the direction of the second axis R2, a second portion of the second axis-side extension part 152 that extends the outer circumference side of the first portion of the second axis-side extension part 151 and the movable body 10 in the direction of the Z axis, and a third portion of the second axis-side extension part 153 that connects the first portion of the second axis-side extension part 151 and the second portion of the second axis-side extension part 152.

The pair of first portions of the second axis-side extension part 151 protrude in the direction of the second axis R2 from the respective edges of the outer circumference sides of the first inclined portion 140b and the second inclined portion 140c. The third portion of the second axis-side extension part 153 bends in the −Z direction from the edge of the outer circumferential side of the first portion of the second axis-side extension part 151. The second portion of the second axis-side extension part 152 includes a first portion 152a that extends the outside of the movable body 10 in the direction of the second axis R2 from the third portion of the second axis-side extension part 153 toward the direction of the Z axis, a bent portion 152b that bends outward in the radial direction from the edge of the first portion 152a in the −Z direction, and a second portion 152c that extends toward the −Z direction from the edge of the outer circumferential side of the bent portion 152b. The second portion 152c includes a second axis-side recessed curved surface 154 that recesses the direction of the second axis R2 in the inner circumferential side toward the movable body 10 on the second axis R2. Further, the second portion 152c includes a pair of rectangular notches 155 formed by cutting out edges at both ends in the circumferential direction in the +Z direction of the second axis-side recessed curved surface 154. By providing the pair of notches 155, the second portion 152c includes a portion having a narrow width in the circumferential direction in the +Z direction of the second axis-side recessed curved surface 154.

Assembly of Optical Unit with Shake-Correction Function

Figure 17:
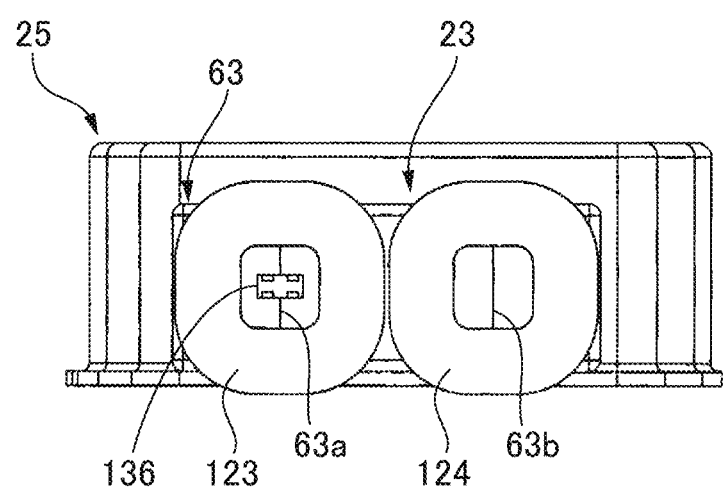
FIG. 17 is an explanatory diagram of a rolling drive structure.

FIG. 17 is an explanatory view of the rolling correctivemagnet drive structure 23 when viewed from the outside in the radial direction. In FIG. 17, the fourth frame plate portion 114 of the case 105 located between the rolling corrective magnet 63 and the two rolling corrective coils 123 and 124 is omitted.

When assembling the optical unit 1 with shake-correction function, as illustrated in FIG. 8, the second portion of the first axis-side extension part 146 of each of the first axis-side extension parts 141 of the gimbal frame 15 is inserted between the respective gimbal frame receiving members 83 fixed to both sides in the direction of the first axis R1 of the plate roller 66 and the plate roller 66. Then, as illustrated in FIG. 6, the first axis-side recessed curved surface 148 provided on each of the second portions of the first axis-side extension part 146 is set in a state of being in contact with the spherical object 84 of each of the gimbal frame receiving members 83. Accordingly, the first connecting mechanism 16 that connects the rotational support structure 12 and the gimbal frame 15 around the first axis R1 is configured. Further, at this time, set is a state in which the pair of arms 89 of the thrust receiving member 85 of each of the gimbal frame receiving members 83 are inserted into the pair of notches 149 provided on each of the second portions of the first axis-side extension part 146. This prevents the gimbal frame 15 from falling out from the gimbal frame receiving members 83 located on both sides in the direction of the first axis R1 toward the +Z direction.

Here, when the first axis-side recessed curved surface 148 of each of the first axis-side extension parts 141 is brought into contact with the spherical object 84 of each of the gimbal frame receiving members 83 on both sides in the direction of the first axis R1, the pair of first axis-side extension parts 141 are bent toward the inner circumference side of each other. Therefore, the second portion of the first axis-side extension part 146 is urged toward the outer circumference side, so that an urging force from the first axis-side extension part 141 acts on the gimbal frame receiving member 83 fixed to the plate roller 66 via the spherical object 84. Accordingly, the first axis-side recessed curved surface 148 of each of the first axis-side extension parts 141 and the spherical object 84 of each of the gimbal frame receiving members 83 can be maintained with a state of being in contact with each other.

Next, as illustrated in FIG. 4, the second portions 152c of each of the second axis-side extension parts 142 is inserted between the respective gimbal frame receiving members 83 fixed to both sides in the direction of the second axis R2 of the case 105 and the case 105. Then, as illustrated in FIG. 7, the second axis-side recessed curved surface 154 provided on each of the second portions 152c is set in a state of being in contact with the spherical object 84 of each of the gimbal frame receiving members 83. Accordingly, the second connecting mechanism 17 that connects the fixed body 11 and the gimbal frame 15 around the second axis R2 is configured. Further, at this time, set is a state in which the pair of arms 89 of the thrust receiving member 85 of each of the gimbal frame receiving members 83 are inserted into the pair of notches 155 provided in each of the second portions 152c. This prevents the gimbal frame 15 from falling out from the gimbal frame receiving members 83 located on both sides in the direction of the second axis R2 toward the +Z direction.

Here, when the second axis-side recessed curved surface 154 of each of the second axis-side extension parts 142 is brought into contact with the spherical object 84 of each of the gimbal frame receiving members 83 on both sides in the direction of the second axis R2, the pair of second axis-side extension parts 142 are bent toward the inner circumference side of each other. Therefore, the second portion 152c is urged toward the outer circumference side, so that an urging force from the second axis-side extension part 142 acts on each of the gimbal frame receiving members 83 fixed to the case 105 via the spherical object 84. Accordingly, the second axis-side recessed curved surface 154 of each of the second axis-side extension parts 142 and the spherical object 84 of each of the gimbal frame receiving members 83 can be maintained with a state of being in contact with each other.

In the state in which the second connecting mechanism 17 is configured, as illustrated in FIGS. 4 and 7, in the second portion of the second axis-side extension part 152 of each of the second axis-side extension parts 142 of the gimbal frame 15, the bent portion 152b is disposed inside the pair of notch portions 106a provided at both ends of the second axis R2 of the case 105 of the fixed body 11. Therefore, in the second portion of the second axis-side extension part 152, the first portion 152a extends toward the direction of the Z axis on the outer side of the movable body 10 in the direction of the second axis R2 on the inner circumferential side of the frame plate portion 106. The bent portion 152b overlaps with the frame plate portion 106 of the case 105 when viewed from the direction of the Z axis. The second portion 152c extends in the direction of the Z axis on the outer side of the frame plate portion 106 in the direction of the second axis R2.

As illustrated in FIG. 4, when the gimbal mechanism 13 is configured, the movable body 10 and the rotational support structure 12 are in a state of being disposed inside the case 105. When the gimbal mechanism 13 is configured, the movable body 10 is supported by the case 105 via the gimbal mechanism 13 and the rotational support structure 12. As a result, the movable body 10 can oscillate around an intersection P at which the optical axis L, the first axis R1, and the second axis R2 intersect with one another. As illustrated in FIGS. 6 and 7, the intersection P is positioned inside the camera module 2.

When the gimbal mechanism 13 is configured, as illustrated in FIG. 5, the first shake corrective magnet 61 and the first shake-correction coil 121 face each other in the direction of the X axis in a state where the first frame plate portion 111 is interposed therebetween. The first shake corrective magnet 61 and the first shake-correction coil 121 constitute the first shake corrective-magnet drive structure 21. Therefore, the movable body 10 rotates around the Y axis due to the power supply to the first shake-correction coil 121. Further, the second shake corrective magnet 62 and the second shake-correction coil 122 face each other in the direction of the X axis in a state in which the third frame plate portion 113 is interposed therebetween. The second shake corrective magnet 62 and the second shake-correction coil 122 constitute the second shake corrective-magnet drive structure 22. Therefore, the movable body 10 rotates around the X axis due to the power supply to the second shake-correction coil 122. The shake corrective-magnet drive structure 20 rotates the movable body 10 around the first axis R1 and the second axis R2 by combining the rotation of the movable body 10 around the Y axis by the first shake corrective-magnet drive structure 21 with the rotation of the movable body 10 around the X axis by the second shake corrective-magnet drive structure 22.

Further, when the gimbal mechanism 13 is configured, the rolling corrective magnet 63 and the two rolling corrective coils 123 and 124 face each other in the direction of the Y axis in a state where the fourth frame plate portion 114 is interposed therebetween. The rolling corrective magnet 63 and the two rolling corrective coils 123 and 124 constitute the rolling corrective-magnet drive structure 23. Therefore, the movable body 10 rotates around the Z axis due to the power supply to the two rolling corrective coils 123 and 124.

Here, when the state in which the gimbal mechanism 13 is configured is viewed from the radial direction, the magnetic polarization line 61a of the first shake corrective magnet 61 extending in the circumferential direction and the opening of the first shake-correction coil 121 overlap with each other. Therefore, the pair of coil portions extending in the circumferential direction in the first shake-correction coil 121 serves as an effective side for exerting a driving force around the Y axis. Further, the first shake corrective magnet 61 and the first magnetic plate 137 overlaps with each other. The first shake corrective magnet 61 and the first magnetic plate 137 constitute a magnetic spring for returning the movable body 10 to a reference angular position in the rotation direction around the Y axis. Further, the first Hall element 131 of the oscillation position sensor 130 and the magnetic polarization line 61a of the first shake corrective magnet 61 overlap with each other. Therefore, the oscillation position sensor 130 can acquire the angular position in the rotational direction around the Y axis based on the output from the first Hall element 131.

Further, the magnetic polarization line 62a of the second shake corrective magnet 62 extending in the circumferential direction overlaps with the opening of the second shake-correction coil 122. Therefore, the pair of coil portions extending in the circumferential direction in the second shake-correction coil 122 serves as an effective side to exert a driving force to the movable body 10 around the X axis. Further, the second shake corrective magnet 62 and the second magnetic plate 138 overlaps with each other. The second shake corrective magnet 62 and the second magnetic plate 138 constitute a magnetic spring for returning the movable body 10 to the reference angular position in the rotation direction around the X axis. Further, the second Hall element 132 of the oscillation position sensor 130 and the magnetic polarization line 62a of the second shake corrective magnet 62 overlap with each other. Therefore, the oscillation position sensor 130 can acquire the angular position in the rotational direction around the X axis based on the output from the second Hall element 132.

Further, as illustrated in FIG. 17, the first magnetic polarization line 63a of the rolling corrective magnet extending in the direction of the Z axis overlaps with the opening of the rolling corrective coil 123. Further, the second magnetic polarization line 63b of the rolling corrective magnet extending in the direction of the Z axis overlaps with the opening of the other rolling corrective coil 124.

Therefore, in each of the rolling corrective coils 123 and 124, the pair of coil portions extending in the direction of the X axis serves as an effective side that exerts a driving force for rotating the movable body 10 around the Z axis. Further, the Hall element 136 of the rotational position sensor 135 overlaps with the first magnetic polarization line 63a. Therefore, the rotational position sensor 135 can acquire the angular position in the rotational direction around the X axis based on the output from the Hall element 136.

Next, the cover 4 covers the case 105 from the direction of the Z axis, and these are fixed by welding. As illustrated in FIGS. 1, 2, and 7, when the state in which the cover 4 is fixed to the case 105 is viewed from the +Z direction, in the object-side end plate portion 8 of the cover 4, the portions located at both ends in the direction of second axis R2 and the bent portions 152b of the gimbal frame 15 face each other in the direction of the Z axis. Accordingly, the object-side end plate portion 8 serves as a retaining portion for preventing the gimbal frame 15 and the movable body 10 from falling out from the fixed body 11 toward the +Z direction in the direction of the Z axis.

Function and Effect

According to this example, the fixed body 11 includes the object-side end plate portion 8 (retaining portion) facing the second axis-side extension part 142 of the gimbal frame 15 connected to the fixed body 11 by the second connecting mechanism 17 from the +Z direction in the direction of the Z axis direction. Therefore, even if the connection of the second connecting mechanism 17 is disconnected due to an external impact or the like, it is possible to prevent the gimbal frame 15 and the movable body 10 from falling off from the fixed body 11 toward the +Z direction in the direction of the Z axis.

Here, the second axis-side extension part 142 of the gimbal frame 15 includes a first portion 152a that extends in the direction of the Z axis on the outer side the movable body 10 in the second axis R2 direction, a bent portion 152b that bends outward in the radial direction from an end of the first portion 152a in the −Z direction, and a second portion 152c that extends in the −Z direction from an end of the bent portion 152b on the outer circumference side. The object-side end plate portion 8 of the cover 4, which serves as a retaining portion, faces the bent portion 152b from the direction of the Z axis on the outer side of the first portion 152a in the radial direction. As a result, the object-side end plate portion 8 is not located in the +Z direction with respect to the first portion 152a of the second axis-side extension part 142. In other words, the object-side end plate portion 8 is not located in the +Z direction with respect to the gimbal frame 15. Therefore, it is possible to prevent the fixed body 11 from becoming larger in the direction of the Z axis.

Further, the gimbal mechanism 13 supports the movable body 10 via the rotational support structure 12. The fixed body 11 supports the movable body 10 via the gimbal mechanism 13 and the rotational support structure 12. The rotational support structure 12 includes: a first annular groove 45 provided in the movable body 10 coaxially with the optical axis L; a plate roller 66, having a second annular groove 65 facing the first annular groove in the direction of the Z axis; a plurality of spherical objects 84 that are inserted into the first annular groove 45 and the second annular groove 65 and roll between the movable body 10 and the plate roller 66; and a pressurization structure 69 that applies a force to bring the first annular groove 45 and the second annular groove 65 closer to each other in the direction of the Z axis. The first connecting mechanism 16 connects the first axis-side extension part 141 and the plate roller 66. Therefore, the rotational support structure 12 that supports the movable body 10 to be rotatable around the Z axis is supported to be rotatable around the first axis R1 and the second axis R2 by the gimbal mechanism 13. Therefore, even when the movable body 10 is rotating around the first axis R1 or the second axis R2, the movable body 10 can be rotated around the rotational axis that coincides with the optical axis L.

Further, the rotational support structure 12 includes a plurality of spherical objects 84 that are inserted into the first annular groove 45 provided in the movable body 10 and the second annular groove 65 provided in the plate roller 66 and roll. Therefore, the rotational axis of the movable body 10 does not become unstable. Further, in the rotational support structure 12, the first annular groove 45 facing the second annular groove 65 of the plate roller 66 in the direction of the Z axis is provided in the movable body 10. Therefore, the rotational support structure 12 can be made smaller in the direction of the Z axis as compared with the case where the first annular groove 45 is provided in a member separate from the movable body 10.

In addition, the case 105 includes a frame plate portion 106 made of non-magnetic metal that surrounds the movable body 10 around the optical axis L. The shake corrective-magnet drive structure 20 that rotates the movable body 10 around the first axis R1 and the second axis R2 includes a shake corrective magnet fixed to the movable body 10 and a shake corrective coil fixed to a side opposite to the shake corrective magnet in the frame plate portion 106. Further, the first portion 152a of the gimbal frame 15 is located inside the frame plate portion 106, the second portion 152c is located on the outer circumference side of the frame plate portion 106, and the bent portion 152b overlaps with the frame plate portion 106 when viewed from the direction of the Z axis. Therefore, the gimbal frame 15 can be made smaller in the direction of the second axis R2 as compared with the case where the bent portion 152b is located closer to the outer circumference side than the frame plate portion 106. Further, in this way, the object-side end plate portion 8 can be positioned on the inner side in the radial direction as compared with the case where the bent portion 152b is located closer to the outer circumference side than the frame plate portion 106.

In addition, the frame plate portion 106 includes a notch 106a at the edge in the +Z direction that overlaps with the second axis R2 when viewed from the direction of the Z axis. The bent portion 152b of the gimbal frame 15 is located inside the notch 106a. Therefore, in the direction of the Z axis, the object-side end plate portion 8 can be provided at a position closer to the edge of the frame plate portion 106 in the +Z direction. Therefore, it is possible to suppress the fixed body 11 from becoming larger in the direction of the Z axis.

Further, the second connecting mechanism 17 includes the spherical object 84 located on the outer circumference side of the frame plate portion 106, the thrust receiving member 85 fixed to the side opposite to the movable body 10 of the frame plate portion 106 and supporting the spherical object 84 on the second axis R2 at a position separated from the frame plate portion 106, and the recessed curved surface provided on the second portion 152c and recessed to the inner circumference side. The second portion 152c is inserted between the spherical object 84 and the frame plate portion 106, and the recessed curved surface and the spherical object 84 come into contact with each other on the second axis R2. As a result, the gimbal frame 15 and the fixed body 11 can be connected to be rotatable around the second axis R2.

In addition, the fixed body 11 includes a cover 4 having a cover frame portion 7 that covers the frame plate portion 106, the first shake-correction coil 121, the second shake-correction coil 122, and the rolling corrective coils 123 and 124 from the outer circumference side and the object-side end plate portion 8 protruding from the end in the +Z direction of the cover frame portion 7 to the inner circumference side The retaining portion that prevents the gimbal frame 15 and the movable body 10 from falling off from the fixed body 11 in the +Z direction in the direction of the Z axis is the object-side end plate portion 8. Therefore, it is easy to provide a retaining portion on the fixed body 11.

Modification

Here, a stopper mechanism 27 may include the second-side stopper part 49b facing the other plate roller extension part 71 from the other side in the circumferential direction at an interval, instead of the second-side stopper part 49b facing the plate roller protruding portion 76 from the other side in the circumferential direction at an interval. For example, the second-side stopper part 49b may be provided on the second bent portion 50.

The pressurization structure 69 may include four magnets fixed to the plate roller 66, instead of the magnetic components 91 to 94. Each magnet is arranged at a position where it overlaps with each of the magnets 56 to 59 when viewed from the direction of the Z axis.

Further, although the magnetic components and the magnets of the pressurization structure 69 are provided at four locations around the optical axis L, these may be provided at two locations on both sides sandwiching the optical axis L.

Note that the first annular groove 45 may be formed on the holder end plate portion 33 of the holder 25. Further, the second annular groove 65 may be formed on the annular plate portion 75 of the plate roller main body portion 73.

What is claimed is:

1. An optical unit with shake-correction function, comprising:
    a movable body including a camera module;
    a gimbal mechanism, configured to support the movable body to be rotatable around a first axis that intersects an optical axis of a lens of the camera module, and support the movable body to be rotatable around a second axis that intersects the optical axis and the first axis; and
    a fixed body including a case in frame-shape, configured to surround the movable body from an outer side in a radial direction around the optical axis, and support the movable body via the gimbal mechanism,
    wherein the gimbal mechanism includes:
        a gimbal frame, having: a main body that overlaps with the movable body when viewed from a direction of the optical axis, a first axis-side extension part that protrudes from the main body in a direction of the first axis, and a second axis-side extension part that protrudes from the main body in a direction of the second axis;
        a first connecting mechanism, configured to connect the first axis-side extension part and the movable body to be rotatable around the first axis; and
        a second connecting mechanism, configured to connect the second axis-side extension part and the case to be rotatable around the second axis,
    wherein the second axis-side extension part includes:
        a first portion, configured to extend in the direction of the optical axis on an outer side of the movable body in the direction of the second-axis;
        a bent portion, configured to bend outward in a radial direction from an end of the first portion on a side opposite to an object; and
        a second portion, configured to extend in the direction of the optical axis from an end of the bent portion on an outer circumference side to the side opposite to the object,
    wherein the second connecting mechanism is configured to connect the second portion and the case; and
    the fixed body includes a retaining portion facing the bent portion from the direction of the optical axis on an outer side in the radial direction of the first portion.

2. The optical unit with shake-correction function according to claim 1, further comprising:
    a rotational support structure, configured to support the movable body to be rotatable around the optical axis of the lens of the camera module,
    wherein the gimbal mechanism is configured to support the movable body via the rotational support structure,
    the fixed body is configured to support the movable body via the gimbal mechanism and the rotational support structure;
    wherein the rotational support structure includes:
        a first annular groove, provided in the movable body coaxially with the optical axis;
        a plate roller, having a second annular groove facing the first annular groove in the direction of the optical axis;
        a plurality of spherical objects, configured to be inserted into the first annular groove and the second annular groove, and roll between the movable body and the plate roller; and
        a pressurization structure, configured to apply a force for bringing the first annular groove and the second annular groove closer to each other in the direction of the optical axis;
    wherein the first connecting mechanism is configured to connect the first axis-side extension part and the plate roller.

3. The optical unit with shake-correction function according to claim 2, further comprising:
    a shake corrective-magnet drive structure, configured to rotate the movable body around the first axis and around the second axis,
    wherein the case includes a frame plate portion made of non-magnetic metal that surrounds the movable body around the optical axis;
    wherein the shake corrective-magnet drive structure includes:
        a shake corrective magnet, fixed to the movable body; and
        a shake corrective coil, fixed to a side opposite to the shake corrective magnet in the frame plate portion;
    wherein the first portion is located inside the frame plate portion;
    the second portion is located on an outer circumference side of the frame plate portion; and
    the bent portion overlaps with the frame plate portion when viewed from the direction of the optical axis.

4. The optical unit with shake-correction function according to claim 3, wherein the frame plate portion includes a notch at an edge on a side of the object that overlaps with the second axis when viewed from the direction of the optical axis; and the bent portion is located inside the notch.

5. The optical unit with shake-correction function according to claim 3, wherein the second connecting mechanism includes:

a spherical object, located on an outer circumference side of the frame plate portion;

a thrust receiving member, configured to be fixed to a side opposite to the movable body of the frame plate portion, and support the spherical object on the second axis at a position separated from the frame plate portion; and a recessed curved surface, provided on the second portion and recessed to an inner circumference side, wherein the second portion is inserted between the spherical object and the frame plate portion; and the recessed curved surface and the spherical object are in contact with each other on the second axis.

6. The optical unit with shake-correction function according to claim 3, wherein the fixed body includes a cover having:

a cover frame portion, configured to cover the frame plate portion and the shake corrective coil from an outer circumference side; and an object-side end plate portion, configured to extend from an end of the cover frame portion on a side of the object to an inner circumference side;

wherein the object-side end plate portion is the retaining portion.

* * * * *